(12) United States Patent
Sekino

(10) Patent No.: US 8,805,757 B2
(45) Date of Patent: Aug. 12, 2014

(54) EVALUATION PREDICTING DEVICE, EVALUATION PREDICTING METHOD, AND PROGRAM

(75) Inventor: Masashi Sekino, Tokyo (JP)

(73) Assignee: Sony Corporation, Tokyo (JP)

(*) Notice: Subject to any disclaimer, the term of this patent is extended or adjusted under 35 U.S.C. 154(b) by 421 days.

(21) Appl. No.: 13/112,684

(22) Filed: May 20, 2011

(65) Prior Publication Data

US 2011/0302126 A1 Dec. 8, 2011

(30) Foreign Application Priority Data

May 31, 2010 (JP) ................................ P2010-124165

(51) Int. Cl.
*G06F 15/18* (2006.01)
*G06F 19/24* (2011.01)

(52) U.S. Cl.
USPC .................................. 706/13; 706/21; 706/25

(58) Field of Classification Search
USPC .......................................................... 706/52
See application file for complete search history.

(56) References Cited

PUBLICATIONS

Wu et al., Incremental Probabilistic Latent Semantic Analysis for Automatic Question Recommendation [online], 2008 [retrieved on May 23, 2013]. Retrieved from the Internet:<URL:http://machinelearning.ru/wiki/images/e/e5/IPLSA_for_Q%26A_systems.pdf>.*

Salakhutdinov, et al., "Probabilistic Matrix Factorization", Department of Computer Science, University of Toronto, In Advances in Neural Information Processing Systems, vol. 20, pp. 1-8, (2008).

* cited by examiner

*Primary Examiner* — Jeffrey A Gaffin
*Assistant Examiner* — Nathan Brown, Jr.
(74) *Attorney, Agent, or Firm* — Finnegan, Henderson, Farabow, Garrett & Dunner, LLP

(57) ABSTRACT

Disclosed herein is an evaluation predicting device including: an estimating section configured to define a plurality of first latent vectors, a plurality of second latent vectors, evaluation values, a plurality of first feature vectors, a plurality of second feature vectors, a first projection matrix, and a second projection matrix, express the first latent vectors and the second latent vectors, and perform Bayesian estimation with the first feature vectors, the second feature vectors, and a known the evaluation value as learning data, and calculate a posterior distribution of a parameter group including the first latent vectors, the second latent vectors, the first projection matrix, and the second projection matrix; and a predicting section configured to calculate a distribution of an unknown the evaluation value on a basis of the posterior distribution of the parameter group.

11 Claims, 17 Drawing Sheets

USER HAVING SIMILAR PREFERENCES

EXAMPLE OF EVALUATION VALUE DB

| USER ID / ITEM ID | 0001 | 0002 | 0003 | 0004 | ...... |
|---|---|---|---|---|---|
| 0001 | 3 | 1 | 3 | 5 | ...... |
| 0002 | 1 | — | 1 | 4 | ...... |
| 0003 | (5) | 2 | — | 1 | ...... |
| 0004 | 4 | 5 | 4 | 2 | ...... |
| ...... | ...... | ...... | ...... | ...... | ...... |

PREDICTION OF EVALUATION VALUE → RECOMMENDATION OF ITEM (ID=0003)

ITEM HAVING SIMILAR FEATURES

EXAMPLE OF EVALUATION VALUE DB

| USER ID / ITEM ID | 0001 | 0002 | 0003 | 0004 | ...... |
|---|---|---|---|---|---|
| 0001 | 3 | 1 | 3 | 5 | ...... |
| 0002 | 1 | — | 1 | 4 | ...... |
| 0003 | 5 | 2 | — | 1 | ...... |
| 0004 | 5 | 1 | (4) | 1 | ...... |
| ...... | ...... | ...... | ...... | ...... | ...... |

PREDICTION OF EVALUATION VALUE → RECOMMENDATION TO USER (ID=0003)

FIG.8

ANALYZE FEATURES OF USER WHO PURCHASED ITEM A, AND DETECT FEATURES OF USER HAVING LIKING FOR ITEM A — ST301

↓

DETECT USER HAVING FEATURES OF USER HAVING LIKING FOR ITEM A WHICH USER IS DETECTED IN ST301 FROM USERS WHO HAVE NOT YET PURCHASED ITEM A — ST302

↓

RECOMMEND ITEM A TO USER DETECTED IN ST302 — ST303

FIG.9

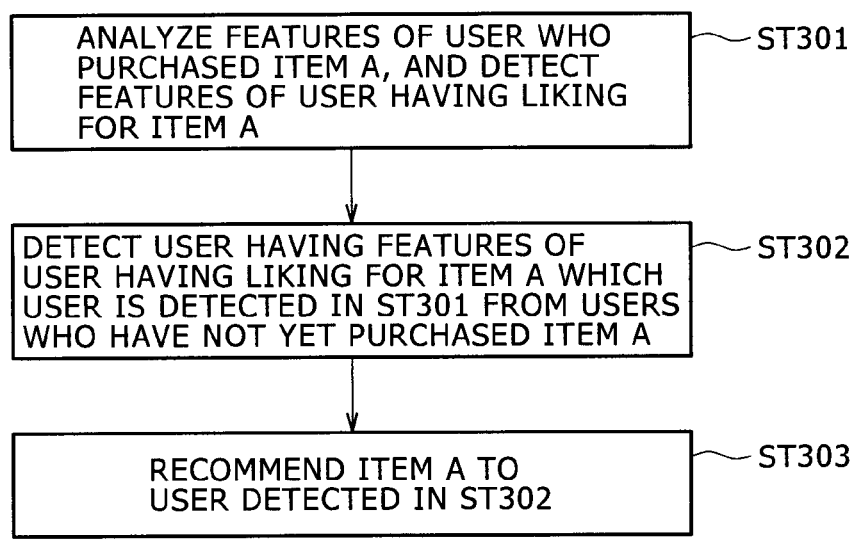

| FEATURE ID \ USER ID | USERS WHO PURCHASED ITEM A | | | USERS WHO HAVE NOT YET PURCHASED ITEM A | | |
|---|---|---|---|---|---|---|
| | 0001 | 0002 | ...... | 1001 | 1002 | ...... |
| 0001 | 3 | 3 | ...... | 3 | 1 | ...... |
| 0002 | 0 | 1 | ...... | 2 | 2 | ...... |
| 0003 | 3 | 3 | ...... | 3 | 3 | ...... |
| 0004 | 2 | 1 | ...... | 1 | 1 | ...... |
| ...... | ...... | ...... | ...... | ...... | ...... | ...... |

FEATURES OF USERS HAVING LIKING FOR ITEM A

※RECOMMEND ITEM A TO USER HAVING ID=1001

| ITEM ID / FEATURE ID | ITEMS PURCHASED BY USER A | | | ITEMS NOT YET PURCHASED BY USER A | | |
|---|---|---|---|---|---|---|
| | 0001 | 0002 | ...... | 1001 | 1002 | ...... |
| 0001 | 3 | 3 | ...... | 3 | 3 | ...... |
| 0002 | 0 | 1 | ...... | 2 | 2 | ...... |
| 0003 | 3 | 3 | ...... | 3 | 3 | ...... |
| 0004 | 2 | 1 | ...... | 1 | 1 | ...... |
| ...... | ...... | ...... | ...... | ...... | ...... | ...... |

FEATURES SUITING PREFERENCES OF USER A

※RECOMMEND ITEM (ID=1001) SUITING PREFERENCES OF USER A

FIG.15

EXAMPLE OF EVALUATION VALUE DB

| USER ID / ITEM ID | i=1 | i=2 | i=3 | ...... | i=M |
|---|---|---|---|---|---|
| j=1 | 3 | 1 | 3 | ...... | 5 |
| j=2 | 1 | 3 | 1 | ...... | 4 |
| j=3 | 1 | 2 | — | ...... | 4 |
| ⋮ | ⋮ | ⋮ | ⋮ | ⋮ $y_{ij}$ | ⋮ |
| j=N | 5 | 1 | 2 | ...... | 1 |

EVALUATION VALUE DESIRED TO BE ESTIMATED

FIG.16

CONFIGURATION OF LATENT FEATURE VECTOR $v_j$

| ITEM ID / LATENT ID | j=1 | j=2 | j=3 | ...... | j=N |
|---|---|---|---|---|---|
| k=1 | $v_{11}$ | $v_{21}$ | $v_{31}$ | ...... | $v_{N1}$ |
| k=2 | $v_{12}$ | $v_{22}$ | $v_{32}$ | ...... | $v_{N2}$ |
| k=3 | $v_{13}$ | $v_{23}$ | $v_{33}$ | ...... | $v_{N3}$ |
| ⋮ | ⋮ | ⋮ | ⋮ | ...... | ⋮ |
| k=H | $v_{1H}$ | $v_{2H}$ | $v_{3H}$ | ...... | $v_{NH}$ |
| | ↓ | ↓ | ↓ | | ↓ |
| | $v_1$ | $v_2$ | $v_3$ | ...... | $v_N$ |

FIG.17

CONFIGURATION OF LATENT FEATURE VECTOR $u_i$

| USER ID / LATENT ID | i=1 | i=2 | i=3 | ...... | i=M |
|---|---|---|---|---|---|
| k'=1 | $u_{11}$ | $u_{21}$ | $u_{31}$ | ...... | $u_{M1}$ |
| k'=2 | $u_{12}$ | $u_{22}$ | $u_{32}$ | ...... | $u_{M2}$ |
| k'=3 | $u_{13}$ | $u_{23}$ | $u_{33}$ | ...... | $u_{M3}$ |
| ⋮ | ⋮ | ⋮ | ⋮ | ...... | ⋮ |
| k'=H | $u_{1H}$ | $u_{2H}$ | $u_{3H}$ | ...... | $u_{MH}$ |
| | ↓ | ↓ | ↓ | | ↓ |
| | $u_1$ | $u_2$ | $u_3$ | ...... | $u_M$ |

FIG.20

CONFIGURATION OF FEATURE VECTOR $x_{ui}$

| FEATURE ID \ USER ID | i=1 | i=2 | i=3 | ...... | i=M |
|---|---|---|---|---|---|
| l=1 | $x_{u11}$ | $x_{u21}$ | $x_{u31}$ | ...... | $x_{uM1}$ |
| l=2 | $x_{u12}$ | $x_{u22}$ | $x_{u32}$ | ...... | $x_{uM2}$ |
| l=3 | $x_{u13}$ | $x_{u23}$ | $x_{u33}$ | ...... | $x_{uM3}$ |
| ⋮ | ⋮ | ⋮ | ⋮ | ...... | ⋮ |
| l=s | $x_{u1s}$ | $x_{u2s}$ | $x_{u3s}$ | ...... | $x_{uMs}$ |

CONFIGURATION OF FEATURE VECTOR $x_{vj}$

| FEATURE ID \ ITEM ID | j=1 | j=2 | j=3 | ...... | j=N |
|---|---|---|---|---|---|
| l'=1 | $x_{v11}$ | $x_{v21}$ | $x_{v31}$ | ...... | $x_{vN1}$ |
| l'=2 | $x_{v12}$ | $x_{v22}$ | $x_{v32}$ | ...... | $x_{vN2}$ |
| l'=3 | $x_{v13}$ | $x_{v23}$ | $x_{v33}$ | ...... | $x_{vN3}$ |
| ⋮ | ⋮ | ⋮ | ⋮ | ...... | ⋮ |
| l'=s' | $x_{v1s'}$ | $x_{v2s'}$ | $x_{v3s'}$ | ...... | $x_{vNs'}$ |

↓ $x_{v1}$  ↓ $x_{v2}$  ↓ $x_{v3}$  ......  ↓ $x_{vN}$

EVALUATION PREDICTING DEVICE, EVALUATION PREDICTING METHOD, AND PROGRAM

BACKGROUND

The present disclosure relates to an evaluation predicting device, an evaluation predicting method, and a program.

Recently, an enormous amount of information has come to be provided to users through broader-band networks. It has therefore become difficult on the part of a user to search the enormous amount of information provided for information sought by the user. On the other hand, from the viewpoint of an information providing side, the information desired to be provided to a user is buried in the enormous amount of information, and such information is difficult for the user to peruse. In order to remedy such a situation, progress has been made in devising mechanisms for accurately extracting information preferred by a user from the enormous amount of information and providing the information to the user.

Filtering methods referred to as collaborative filtering and content-based filtering, for example, are known as mechanisms for extracting information preferred by a user from an enormous amount of information. In addition, there are kinds of collaborative filtering including user-based collaborative filtering, item-based collaborative filtering, matrix factorization-based collaborative filtering (see Ruslan Salakhutdinov and Andriy Mnih, "Probabilistic Matrix Factorization," in Advances in Neural Information Processing Systems, volume 20, 2008, hereinafter referred to as Non-Patent Document 1), and the like. On the other hand, there are kinds of content-based filtering including user-based content-based filtering, item-based content-based filtering, and the like.

User-based collaborative filtering is a method of detecting a user B having similar preferences to those of a certain user A, and extracting an item liked by the user A on the basis of evaluation performed by the user B for a certain item group. For example, when the user B favorably evaluated an item X, the user A is expected to like the item X too. Based on this expectation, the item X can be extracted as information liked by the user A. Incidentally, matrix factorization-based collaborative filtering is a method combining features of user-based collaborative filtering and item-based collaborative filtering. For details of matrix factorization-based collaborative filtering, reference is to be made to Non-Patent Document 1.

In addition, item-based collaborative filtering is a method of detecting an item B having similar features to those of a certain item A, and extracting a user having a liking for the item A on the basis of evaluation performed by a certain user group for the item B. For example, when a user X favorably evaluated the item B, the item A is expected to be liked by the user X too. Based on this expectation, the user X can be extracted as a user having a liking for the item A.

In addition, user-based content-based filtering is for example a method of analyzing, when there is an item group liked by a user A, the preferences of the user A on the basis of the features of the item group, and extracting a new item having features suiting the preferences of the user A. Item-based content-based filtering is for example a method of analyzing, when there is a user group having a liking for an item A, the features of the item A on the basis of the preferences of the user group, and extracting a new user having a liking for the features of the item A.

SUMMARY

When filtering methods as described above are used, information liked by a user can be extracted from an enormous amount of information. The user can extract desired information from an information group narrowed down to only information liked by the user, so that information searchability is greatly improved. Meanwhile, from the viewpoint of an information providing side, the information liked by the user can be provided accurately, so that effective information provision can be achieved. However, when the accuracy of filtering is low, the narrowing down of the information group to the information liked by the user is not performed properly, and the effects of an improvement in searchability and effective information provision are not obtained. There is thus a desire for a filtering method having high accuracy.

It is known that the above-described collaborative filtering has low accuracy under conditions of a small number of users or a small number of items. On the other hand, it is known that content-based filtering has lower accuracy than collaborative filtering under conditions of a large number of users and a large number of items. In addition, it is known that content-based filtering has low accuracy unless kinds of features characterizing a user group or an item group are selected well.

Accordingly, the present disclosure has been made in view of the above problems. It is desirable to provide an evaluation predicting device, an evaluation predicting method, and a program that are new and improved which can achieve more accurate filtering.

According to a viewpoint of the present disclosure, there is provided an evaluation predicting device including: an estimating section configured to define a plurality of first latent vectors indicating features latently possessed by a plurality of first items, respectively, a plurality of second latent vectors indicating features latently possessed by a plurality of second items, respectively, evaluation values corresponding to respective combinations of the first items and the second items and expressed by inner products of the first latent vectors and the second latent vectors, a plurality of first feature vectors indicating known features possessed by the plurality of the first items, a plurality of second feature vectors indicating known features possessed by the plurality of the second items, a first projection matrix for projecting the first feature vectors into a space of the first latent vectors, and a second projection matrix for projecting the second feature vectors into a space of the second latent vectors, express the first latent vectors by a normal distribution having projection values of the first feature vectors projected by the first projection matrix as expected values, and express the second latent vectors by a normal distribution having projection values of the second feature vectors projected by the second projection matrix as expected values, and perform Bayesian estimation with the first feature vectors, the second feature vectors, and a known evaluation value as learning data, and calculate a posterior distribution of a parameter group including the first latent vectors, the second latent vectors, the first projection matrix, and the second projection matrix; and a predicting section configured to calculate a distribution of an unknown evaluation value on a basis of the posterior distribution of the parameter group.

In addition, the predicting section may be configured to calculate an expected value of the unknown evaluation value on the basis of the posterior distribution of the parameter group.

In addition, the above-described evaluation predicting device may further include a recommendation object determining section configured to, when the expected value of the unknown evaluation value calculated by the predicting section is higher than a predetermined value, determine a second item corresponding to the unknown evaluation value as an object of recommendation of a first item corresponding to the unknown evaluation value.

In addition, the second item may represent a user. In this case, the above-described evaluation predicting device may further include a recommending section configured to recommend the first item to the user corresponding to the object of recommendation of the first item when the recommendation object determining section determines the object of recommendation of the first item.

According to another viewpoint of the present disclosure, there is provided an evaluation predicting device including: an estimating section configured to define N first latent vectors $u_i(t)$ (i=1, ..., N) indicating features latently possessed by N first items, respectively, at time t, M second latent vectors $v_j(t)$ (j=1, ..., M) indicating features latently possessed by M second items, respectively, at time t, evaluation values $y_{ij}(t)$ corresponding to respective combinations of the first items and the second items and expressed by inner products of the first latent vectors $u_i(t)$ and the second latent vectors $v_j(t)$ at time t, a first projection matrix for projecting first latent vectors $u_i(t-1)$ at time (t−1) into a space of the first latent vectors $u_i(t)$ at time t, and a second projection matrix for projecting second latent vectors $v_j(t-1)$ at time (t−1) into a space of the second latent vectors $v_j(t)$ at time t, express the first latent vectors $u_i(t)$ at time t by a normal distribution having projection values obtained by projecting the first latent vectors $u_i(t-1)$ at time (t−1) by the first projection matrix as expected values, and express the second latent vectors $v_j(t)$ at time t by a normal distribution having projection values obtained by projecting the second latent vectors $v_j(t-1)$ at time (t−1) by the second projection matrix as expected values, and perform Bayesian estimation with the first latent vectors $u_i(t-1)$, the second latent vectors $v_j(t-1)$, and evaluation values $y_{ij}(t-1)$ at time (t−1) as learning data, and calculate a posterior distribution of a parameter group including the first latent vectors $u_i(t)$, the second latent vectors $v_j(t)$, the first projection matrix, and the second projection matrix at time t; and a predicting section configured to calculate an expected value of an evaluation value $y_{ij}(t)$ at time t on a basis of the posterior distribution of the parameter group at time t.

In addition, the predicting section may be configured to calculate expected values of the first latent vectors $u_i(t)$, expected values of the second latent vectors $v_j(t)$, and the evaluation values $y_{ij}(t)$ at time t on the basis of the posterior distribution of the parameter group at the time t, the estimating section may be configured to express first latent vectors $u_i(t+1)$ at time (t+1) by a normal distribution having projection values obtained by projecting the expected values of the first latent vectors $u_i(t)$ at time t by the first projection matrix as expected values, and express second latent vectors $v_j(t+1)$ at time (t+1) by a normal distribution having projection values obtained by projecting the expected values of the second latent vectors $v_j(t)$ at time t by the second projection matrix as expected values, and perform variational Bayesian estimation with the first latent vectors $u_i(t)$, the second latent vectors $v_j(t)$, and the evaluation values $y_{ij}(t)$ at time t as learning data, and calculate a posterior distribution of a parameter group including the first latent vectors $u_i(t+1)$, the second latent vectors $v_j(t+1)$, the first projection matrix, and the second projection matrix at time (t+1), and the predicting section may be configured to calculate an expected value of an evaluation value $y_{ij}(t+1)$ at time (t+1) on a basis of the posterior distribution of the parameter group at time (t+1).

In addition, the above-described evaluation predicting device may further include a recommendation object determining section configured to, when the expected value of the evaluation value $y_{ij}(t+1)$ calculated by the predicting section is higher than a predetermined value, determine a second item corresponding to the evaluation value $y_{ij}(t+1)$ as an object of recommendation of a first item corresponding to the evaluation value $y_{ij}(t+1)$.

In addition, the second item may represent a user. In this case, the above-described evaluation predicting device may further include a recommending section configured to recommend the first item to the user corresponding to the object of recommendation of the first item when the recommendation object determining section determines the object of recommendation of the first item.

According to another viewpoint of the present disclosure, there is provided an evaluation predicting method including: defining a plurality of first latent vectors indicating features latently possessed by a plurality of first items, respectively, a plurality of second latent vectors indicating features latently possessed by a plurality of second items, respectively, evaluation values corresponding to respective combinations of the first items and the second items and expressed by inner products of the first latent vectors and the second latent vectors, a plurality of first feature vectors indicating known features possessed by the plurality of the first items, a plurality of second feature vectors indicating known features possessed by the plurality of the second items, a first projection matrix for projecting the first feature vectors into a space of the first latent vectors, and a second projection matrix for projecting the second feature vectors into a space of the second latent vectors, expressing the first latent vectors by a normal distribution having projection values of the first feature vectors projected by the first projection matrix as expected values, and expressing the second latent vectors by a normal distribution having projection values of the second feature vectors projected by the second projection matrix as expected values, and performing Bayesian estimation with the first feature vectors, the second feature vectors, and a known evaluation value as learning data, and calculating a posterior distribution of a parameter group including the first latent vectors, the second latent vectors, the first projection matrix, and the second projection matrix; and calculating a distribution of an unknown evaluation value on a basis of the posterior distribution of the parameter group.

According to another viewpoint of the present disclosure, there is provided an evaluation predicting method including: defining N first latent vectors $u_i(t)$ (i=1, ..., N) indicating features latently possessed by N first items, respectively, at time t, M second latent vectors $v_j(t)$ (j=1, ..., M) indicating features latently possessed by M second items, respectively, at time t, evaluation values $y_{ij}(t)$ corresponding to respective combinations of the first items and the second items and expressed by inner products of the first latent vectors $u_i(t)$ and the second latent vectors $v_j(t)$ at time t, a first projection matrix for projecting first latent vectors $u_i(t-1)$ at time (t−1) into a space of the first latent vectors $u_i(t)$ at time t, and a second projection matrix for projecting second latent vectors $v_j(t-1)$ at time (t−1) into a space of the second latent vectors $v_j(t)$ at time t, expressing the first latent vectors $u_i(t)$ at time t by a normal distribution having projection values obtained by projecting the first latent vectors $u_i(t-1)$ at time (t−1) by the first projection matrix as expected values, and expressing the second latent vectors $v_j(t)$ at time t by a normal distribution having projection values obtained by projecting the second latent vectors $v_j(t-1)$ at time (t−1) by the second projection matrix as expected values, and performing Bayesian estimation with the first latent vectors $u_i(t-1)$, the second latent vectors $v_j(t-1)$, and evaluation values $y_{ij}(t-1)$ at time (t−1) as learning data, and calculating a posterior distribution of a parameter group including the first latent vectors $u_i(t)$, the second latent vectors $v_j(t)$, the first projection matrix, and the second projection matrix at time t; and calculating an expected value of an evaluation value $y_{ij}(t)$ at time t on a basis of the posterior distribution of the parameter group at time t.

According to another viewpoint of the present disclosure, there is provided a program for making a computer realize: an estimating function of defining a plurality of first latent vectors indicating features latently possessed by a plurality of first items, respectively, a plurality of second latent vectors indicating features latently possessed by a plurality of second items, respectively, evaluation values corresponding to respective combinations of the first items and the second items and expressed by inner products of the first latent vectors and the second latent vectors, a plurality of first feature vectors indicating known features possessed by the plurality of the first items, a plurality of second feature vectors indicating known features possessed by the plurality of the second items, a first projection matrix for projecting the first feature vectors into a space of the first latent vectors, and a second projection matrix for projecting the second feature vectors into a space of the second latent vectors, expressing the first latent vectors by a normal distribution having projection values of the first feature vectors projected by the first projection matrix as expected values, and expressing the second latent vectors by a normal distribution having projection values of the second feature vectors projected by the second projection matrix as expected values, and performing Bayesian estimation with the first feature vectors, the second feature vectors, and a known evaluation value as learning data, and calculating a posterior distribution of a parameter group including the first latent vectors, the second latent vectors, the first projection matrix, and the second projection matrix; and a predicting function of calculating a distribution of an unknown evaluation value on a basis of the posterior distribution of the parameter group.

According to another viewpoint of the present disclosure, there is provided a program for making a computer realize: an estimating function of defining N first latent vectors $u_i(t)$ (i= 1, . . . , N) indicating features latently possessed by N first items, respectively, at time t, M second latent vectors $v_j(t)$ (j=1, . . . , M) indicating features latently possessed by M second items, respectively, at time t, evaluation values $y_{ij}(t)$ corresponding to respective combinations of the first items and the second items and expressed by inner products of the first latent vectors $u_i(t)$ and the second latent vectors $v_j(t)$ at time t, a first projection matrix for projecting first latent vectors $u_i(t-1)$ at time (t−1) into a space of the first latent vectors $u_i(t)$ at time t, and a second projection matrix for projecting second latent vectors $v_j(t-1)$ at time (t−1) into a space of the second latent vectors $v_j(t)$ at time t, expressing the first latent vectors $u_i(t)$ at time t by a normal distribution having projection values obtained by projecting the first latent vectors $u_i(t-1)$ at time (t−1) by the first projection matrix as expected values, and expressing the second latent vectors $v_j(t)$ at time t by a normal distribution having projection values obtained by projecting the second latent vectors $v_j(t-1)$ at time (t−1) by the second projection matrix as expected values, and performing Bayesian estimation with the first latent vectors $u_i(t-1)$, the second latent vectors $v_j(t-1)$, and evaluation values $y_{ij}(t-1)$ at time (t−1) as learning data, and calculating a posterior distribution of a parameter group including the first latent vectors $u_i(t)$, the second latent vectors $v_j(t)$, the first projection matrix, and the second projection matrix at time t; and a predicting function of calculating an expected value of an evaluation value $y_{ij}(t)$ at time t on a basis of the posterior distribution of the parameter group at time t.

In addition, according to another viewpoint of the present disclosure, there is provided a recording medium readable by a computer on which recording medium the above program is recorded.

As described above, according to the present disclosure, more accurate filtering can be achieved.

BRIEF DESCRIPTION OF THE DRAWINGS

FIG. 8 is a diagram of assistance in explaining operation of the recommendation system capable of realizing item recommendation based on user-based content-based filtering;

FIG. 9 is a diagram of assistance in explaining the operation of the recommendation system capable of realizing item recommendation based on user-based content-based filtering;

FIG. 15 is a diagram of assistance in explaining the operation of the recommendation system capable of realizing item recommendation based on matrix factorization-based collaborative filtering;

FIG. 16 is a diagram of assistance in explaining the operation of the recommendation system capable of realizing item recommendation based on matrix factorization-based collaborative filtering;

FIG. 17 is a diagram of assistance in explaining the operation of the recommendation system capable of realizing item recommendation based on matrix factorization-based collaborative filtering;

FIG. 20 is a diagram of assistance in explaining the operation of the evaluation value predicting device according to the first embodiment of the present disclosure;

FIG. 21 is a diagram of assistance in explaining the operation of the evaluation value predicting device according to the first embodiment of the present disclosure;

DETAILED DESCRIPTION OF THE PREFERRED EMBODIMENTS

Figure 1:
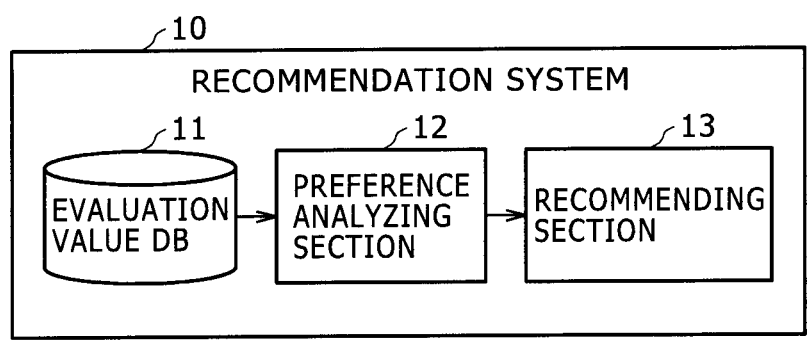
FIG. 1 is a diagram of assistance in explaining a system configuration of a recommendation system capable of realizing item recommendation based on user-based collaborative filtering.

Preferred embodiments of the present disclosure will hereinafter be described in detail with reference to the accompanying drawings. Incidentally, repeated description of constituent elements having essentially identical functional constitutions in the present specification and the drawings will be omitted by identifying the constituent elements by the same reference numerals.

[Flow of Description]

A flow of description relating to embodiments of the present disclosure to be described in the following will be briefly described in the following. First, a system configuration of a recommendation system capable of recommending an item on the basis of user-based collaborative filtering and operation of the recommendation system will be described with reference to FIGS. 1 to 3. Next, a system configuration of a recommendation system capable of recommending an item on the basis of item-based collaborative filtering and operation of the recommendation system will be described with reference to FIGS. 4 to 6.

Next, a system configuration of a recommendation system capable of recommending an item on the basis of user-based content-based filtering and operation of the recommendation system will be described with reference to FIGS. 7 to 9. Next, a system configuration of a recommendation system capable of recommending an item on the basis of item-based content-based filtering and operation of the recommendation system will be described with reference to FIGS. 10 to 12. Next, a system configuration of a recommendation system capable of recommending an item on the basis of matrix factorization-based collaborative filtering and operation of the recommendation system will be described with reference to FIGS. 13 to 17.

Next, a functional configuration of an evaluation value predicting device (recommendation system) capable of predicting an evaluation value and recommending an item on the basis of probabilistic matrix factorization-based collaborative filtering according to a first embodiment of the present disclosure and operation of the evaluation value predicting device will be described with reference to FIGS. 18 to 21. Next, a functional configuration of an evaluation value predicting device capable of time-series prediction of an evaluation value on the basis of probabilistic matrix factorization-based collaborative filtering according to a second embodiment of the present disclosure and operation of the evaluation value predicting device will be described with reference to FIGS. 22 and 23. Next, a hardware configuration of an information processing device capable of realizing functions of the evaluation value predicting devices according to the first and second embodiments of the present disclosure will be described with reference to FIG. 24.

(Items of Description)

1: Introduction
  1-1: User-Based Collaborative Filtering
    1-1-1: Configuration of Recommendation System 10
    1-1-2: Operation of Recommendation System 10
  1-2: Item-Based Collaborative Filtering
    1-2-1: Configuration of Recommendation System 20
    1-2-2: Operation of Recommendation System 20
  1-3: User-Based Content-Based Filtering
    1-3-1: Configuration of Recommendation System 30
    1-3-2: Operation of Recommendation System 30
  1-4: Item-Based Content-Based Filtering
    1-4-1: Configuration of Recommendation System 40
    1-4-2: Operation of Recommendation System 40
  1-5: Matrix Factorization-Based Collaborative Filtering
    1-5-1: Configuration of Recommendation System 50
    1-5-2: Operation of Recommendation System 50
2: First Embodiment
  2-1: Viewpoint
  2-2: Functional Configuration of Evaluation Value Predicting Device 100
  2-3: Operation of Evaluation Value Predicting Device 100
3: Second Embodiment
  3-1: Functional Configuration of Evaluation Value Predicting Device 130
  3-2: Operation of Evaluation Value Predicting Device 130
4: Example of Hardware Configuration <1: Introduction>

Brief Description will first be made of user-based collaborative filtering, item-based collaborative filtering, user-based content-based filtering, item-based content-based filtering, and matrix factorization-based collaborative filtering. Then, problems with these ordinary filtering methods will be summarized. It is to be noted that filtering methods according to present embodiments (which methods may hereinafter be referred to as present methods) solve the problems with these ordinary filtering methods.

[1-1: User-Based Collaborative Filtering]

Description will first be made of user-based collaborative filtering. User-based collaborative filtering is a method using evaluation values of another user having similar preferences to those of a certain user to determine an item to be recommended to the certain user.

(1-1-1: Configuration of Recommendation System 10)

A functional configuration of a recommendation system 10 capable of realizing user-based collaborative filtering will first be described with reference to FIG. 1. FIG. 1 is a diagram of assistance in explaining a functional configuration of the recommendation system 10 capable of realizing user-based collaborative filtering.

As shown in FIG. 1, the recommendation system 10 is composed mainly of an evaluation value database 11, a preference analyzing section 12, and a recommending section 13.

(Evaluation Value Database 11)

Figures 3, 4:
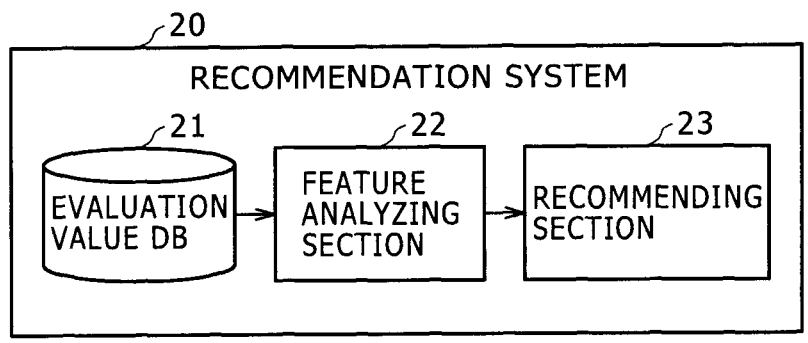
FIG. 3 is a diagram of assistance in explaining the operation of the recommendation system capable of realizing item recommendation based on user-based collaborative filtering.
FIG. 4 is a diagram of assistance in explaining a system configuration of a recommendation system capable of realizing item recommendation based on item-based collaborative filtering.

As shown in FIG. 3, the evaluation value database 11 stores evaluation values corresponding to combinations of users and items. For example, in FIG. 3, an evaluation value given by a user having a user ID=0001 to an item having an item ID=0001 is 3. Similarly, the evaluation value database 11 stores evaluation values given by each user to each item. There are of course combinations of users and items to which no evaluation value is given.

In the example of FIG. 3, a user having a user ID=0002 has not given an evaluation value to an item having an item ID=0002. The evaluation value database 11 therefore does not store an evaluation value corresponding to the combination of the user having the user ID=0002 and the item having the item ID=0002. Similarly, a user having a user ID=0003 has not given an evaluation value to an item having an item ID=0003. The evaluation value database 11 therefore does not store an evaluation value corresponding to the combination of the user having the user ID=0003 and the item having the item ID=0003.

The configuration of the evaluation value database 11 shown in FIG. 3 is an example. However, the evaluation value database 11 stores evaluation values corresponding to such combinations of items and users.

(Preference Analyzing Section 12)

Reference will be made to FIG. 1 again. The preference analyzing section 12 is a section configured to analyze the preferences of each user using the evaluation values stored in the evaluation value database 11. First, the preference analyzing section 12 detects a field in which no evaluation value is stored in the evaluation value database 11, and identifies a user corresponding to the field. In the example of FIG. 3, the preference analyzing section 12 for example identifies the user having the user ID=0003. Next, the preference analyzing section 12 refers to a combination of evaluation values given to respective items by the user having the user ID=0003, and detects a user (user having similar preferences) who has given a combination of evaluation values similar to the combination of the evaluation values given by the user having the user ID=0003.

In the example of FIG. 3, the user having the user ID=0003 has given an evaluation values 3 and 4 (relatively high rating) to items having item IDs=0001 and 0004, respectively, and has given an evaluation value 1 (lowest rating) to the item having the item ID=0002. Accordingly, the preference analyzing section 12 identifies a user who has rated the items having the item IDs=0001 and 0004 high, and rated the item having the item ID=0002 low. In the example of FIG. 3, the preference analyzing section 12 identifies the user having the user ID=0001 as such a user (user having similar preferences to those of the user having the user ID=0003).

Next, the preference analyzing section 12 predicts an evaluation value for an item (item having the item ID=0003) to which the user having the user ID=0003 has not given an evaluation value. At this time, the preference analyzing section 12 refers to an evaluation value given to the item ID=0003 by the user identified in advance (user having the user ID=0001). The user having the user ID=0001 has given an evaluation value 5 (highest rating) to the item having the item ID=0003. The preference analyzing section 12 therefore predicts that the user having the user ID=0003 will also rate the item having the item ID=0003 high.

Accordingly, on the basis of this prediction, the preference analyzing section 12 sets a rating of the user having the user ID=0003 for the item having the item ID=0003 "high" (for example an evaluation value 4 or 5). The preference analyzing section 12 then notifies the set rating or the evaluation value to the recommending section 13. Similarly, the preference analyzing section 12 also predicts a rating of the user having the user ID=0002 for the item having the item ID=0002 to which item the user having the user ID=0002 has not given an evaluation value, and notifies a result of the prediction to the recommending section 13. The preference analyzing section 12 thus predicts a rating for an unevaluated item by comparing evaluation values of users having similar preferences to each other.

(Recommending Section 13)

Reference will be made to FIG. 1 again. As described above, a rating or an evaluation value for an unevaluated item which rating or evaluation value has been predicted by the preference analyzing section 12 is notified to the recommending section 13. The recommending section 13 recommends the item to a user on the basis of the rating or the evaluation value predicted for the unevaluated item. In the example of FIG. 3, when the recommending section 13 is notified that the rating corresponding to the combination of the user having the user ID=0003 and the item having the item ID=0003 is "high," the recommending section 13 recommends the item having the item ID=0003 to the user having the user ID=0003. In addition, when the recommending section 13 is notified that the rating corresponding to the combination of the user having the user ID=0002 and the item having the item ID=0002 is "low," the recommending section 13 does not recommend the item having the item ID=0002 to the user having the user ID=0002.

As described above, the recommendation system 10 realizing the processing of user-based collaborative filtering uses an evaluation value of another user B having similar preferences to those of a certain user A to predict a preference (rating) of the user A for an item unevaluated by the user A. Then, the recommendation system 10 recommends the item to the user A when the predicted rating is high, and does not recommend the item to the user A when the predicted rating is low. Incidentally, the above description has been made of a configuration for detecting only one user having similar preferences and referring to an evaluation value of the user for simplicity, a method is used in practice which predicts a rating for an unevaluated item using evaluation values of a plurality of users having similar preferences.

(1-1-2: Operation of Recommendation System 10)

Figure 2:
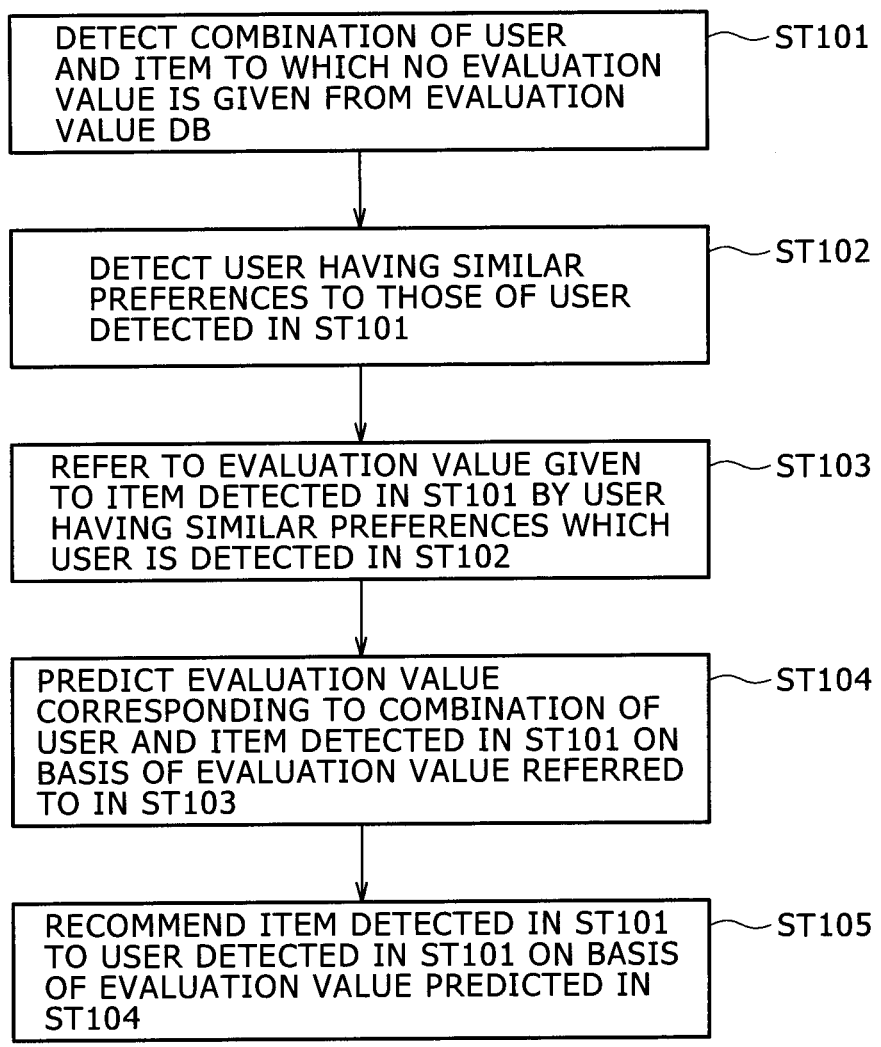
FIG. 2 is a diagram of assistance in explaining operation of the recommendation system capable of realizing item recommendation based on user-based collaborative filtering.

An operation of the recommendation system 10 and a flow of processing of user-based collaborative filtering will next be described with reference to FIG. 2. FIG. 2 is a diagram of assistance in explaining a flow of processing of user-based collaborative filtering.

First, the recommendation system 10 detects a combination of a user and an item to which combination an evaluation value is not given from the evaluation value database 11 by a function of the preference analyzing section 12 (step ST101). Next, the recommendation system 10 detects a user having similar preferences to those of the user detected in step ST101 by a function of the preference analyzing section 12 (step ST102). Next, the recommendation system 10 refers to an evaluation value given to the item detected in step ST101 by the user having similar preferences which user is detected in step ST102 by a function of the preference analyzing section 12 (step ST103).

Next, the recommendation system 10 predicts an evaluation value (rating) corresponding to the combination of the user and the item detected in step ST101 on the basis of the evaluation value referred to in step ST103 by a function of the preference analyzing section 12 (step ST104). A result of the prediction in step ST104 is notified from the preference analyzing section 12 to the recommending section 13. Next, when the evaluation value predicted in step ST104 is high, the recommendation system 10 recommends the item detected in step ST101 to the user detected in step ST101 by a function of the recommending section 13 (step ST105). Of course, when the evaluation value is low, the recommendation system 10 does not recommend the item.

As described above, in user-based collaborative filtering, a rating of a certain user for an unevaluated item is predicted using an evaluation value of a user having similar preferences to those of the certain user. Then, when the rating is high, the item is recommended.

(Problems of User-Based Collaborative Filtering)

As is inferred from the method of rating prediction in user-based collaborative filtering described thus far, user-based collaborative filtering provides high accuracy when there are a large number of users and a large number of items, and the evaluation value database 11 stores many logs of evaluation values. However, when there are a small number of users, a user having similar preferences is not detected well, and thus the accuracy of rating prediction becomes low. In addition, a user having similar preferences to those of a user leaving many items unevaluated cannot be detected well, and thus the accuracy of rating prediction becomes low. That is, user-based collaborative filtering has a problem of difficulty in recommending an appropriate item suiting the preferences of a user unless under conditions of a large number of users, a large number of items, and many logs of evaluation values.

[1-2: Item-Based Collaborative Filtering]

Item-based collaborative filtering will next be described. Item-based collaborative filtering is a method using an evaluation value of another item having similar features to those of a certain item to determine a user as an object of recommendation of the certain item.

(1-2-1: Configuration of Recommendation System 20)

A functional configuration of a recommendation system 20 capable of realizing item-based collaborative filtering will first be described with reference to FIG. 4. FIG. 4 is a diagram of assistance in explaining a functional configuration of the recommendation system 20 capable of realizing item-based collaborative filtering.

As shown in FIG. 4, the recommendation system 20 is composed mainly of an evaluation value database 21, a feature analyzing section 22, and a recommending section 23.

(Evaluation Value Database 21)

Figures 6, 7:
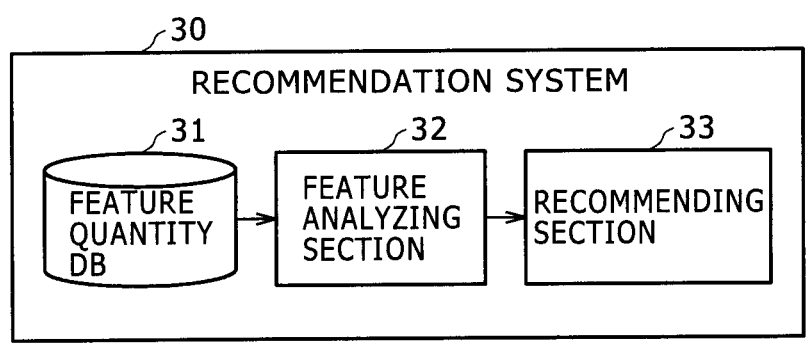
FIG. 6 is a diagram of assistance in explaining the operation of the recommendation system capable of realizing item recommendation based on item-based collaborative filtering.
FIG. 7 is a diagram of assistance in explaining a system configuration of a recommendation system capable of realizing item recommendation based on user-based content-based filtering.

As shown in FIG. 6, the evaluation value database 21 stores evaluation values corresponding to combinations of users and items. For example, in FIG. 6, an evaluation value given by a user having a user ID=0001 to an item having an item ID=0001 is 3. Similarly, the evaluation value database 21 stores evaluation values given by each user to each item. There are of course combinations of users and items to which no evaluation value is given.

In the example of FIG. 6, a user having a user ID=0002 has not given an evaluation value to an item having an item ID=0002. The evaluation value database 21 therefore does not store an evaluation value corresponding to the combination of the user having the user ID=0002 and the item having the item ID=0002. Similarly, a user having a user ID=0003 has not given an evaluation value to an item having an item ID=0003. The evaluation value database 21 therefore does not store an evaluation value corresponding to the combination of the user having the user ID=0003 and the item having the item ID=0003.

The configuration of the evaluation value database 21 shown in FIG. 6 is an example. However, the evaluation value database 21 stores evaluation values corresponding to such combinations of items and users.

(Feature Analyzing Section 22)

Reference will be made to FIG. 4 again. The feature analyzing section 22 is a section configured to analyze the features of each item using the evaluation values stored in the evaluation value database 21. First, the feature analyzing section 22 detects a field in which no evaluation value is stored in the evaluation value database 21, and identifies an item corresponding to the field. In the example of FIG. 6, the feature analyzing section 22 for example identifies the item having the item ID=0003. Next, the feature analyzing section 22 refers to a combination of evaluation values given by each user to the item having the item ID=0003, and detects an item (item having similar features) given a combination of evaluation values similar to the combination of the evaluation values.

In the example of FIG. 6, the item having the item ID=0003 is given an evaluation value 5 (highest rating) by the user having the user ID=0001, and is given an evaluation value 1 (lowest rating) by the user having the user ID=0004. Accordingly, the feature analyzing section 22 identifies an item rated high by the user having the user ID=0001 and rated low by the user having the user ID=0004. In the example of FIG. 6, the feature analyzing section 22 identifies an item having the item ID=0004 as such an item (item having similar features to those of the item having the item ID=0003).

Next, the feature analyzing section 22 predicts an evaluation value expected to be given to the item having the item ID=0003 by a user (user having the user ID=0003) who has not given an evaluation value to the item having the item ID=0003. At this time, the feature analyzing section 22 refers to an evaluation value given to the item identified in advance (item having the item ID=0004) by the user having the user ID=0003. The user having the user ID=0003 has given an evaluation value 4 (relatively high rating) to the item having the item ID=0004. The feature analyzing section 22 therefore predicts that the item having the item ID=0003 will also be rated high by the user having the user ID=0003.

Accordingly, on the basis of this prediction, the feature analyzing section 22 sets a rating expected to be given to the item having the item ID=0003 by the user having the user ID=0003 "high" (for example an evaluation value 4 or 5). The feature analyzing section 22 then notifies the set rating or the evaluation value to the recommending section 23. Similarly, the feature analyzing section 22 also predicts a rating of the user having the user ID=0002 for the item having the item ID=0002 to which item the user having the user ID=0002 has not given an evaluation value, and notifies a result of the prediction to the recommending section 23. The feature analyzing section 22 thus predicts a rating expected to be given to an item by a user who has not evaluated the item by comparing evaluation values of items having similar features to each other.

(Recommending Section 23)

Reference will be made to FIG. 4 again. As described above, a rating or an evaluation value corresponding to a user who has not evaluated the item, which rating or evaluation value has been predicted by the feature analyzing section 22, is notified to the recommending section 23. The recommending section 23 recommends the item to the user on the basis of the rating or the evaluation value predicted for the user who has not evaluated the item. In the example of FIG. 6, when the recommending section 23 is notified that the rating corresponding to the combination of the user having the user ID=0003 and the item having the item ID=0003 is "high," the recommending section 23 recommends the item having the item ID=0003 to the user having the user ID=0003. In addition, when the recommending section 23 is notified that the rating corresponding to the combination of the user having the user ID=0002 and the item having the item ID=0002 is "low," the recommending section 23 does not recommend the item having the item ID=0002 to the user having the user ID=0002.

As described above, the recommendation system 20 realizing the processing of item-based collaborative filtering uses an evaluation value given to another item B having similar features to those of a certain item A to predict a preference (rating) of a user who has not evaluated the item A for the item A. Then, the recommendation system 20 recommends the item A to the user when the predicted rating is high, and does not recommend the item A to the user when the predicted rating is low. Incidentally, the above description has been made of a configuration for detecting only one item having similar features and referring to an evaluation value given to the item for simplicity, a method is used in practice which predicts a rating for an unevaluated item using evaluation values of a plurality of items having similar features.

(1-2-2: Operation of Recommendation System 20)

Figure 5:
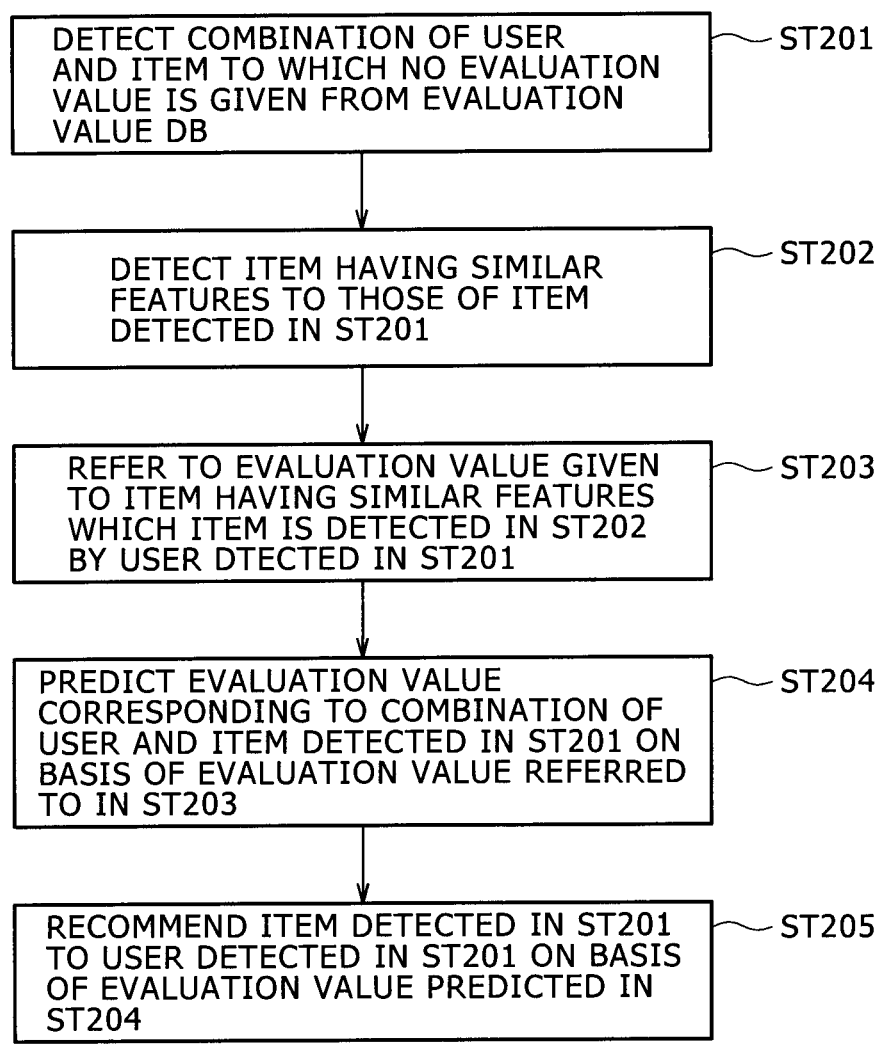
FIG. 5 is a diagram of assistance in explaining operation of the recommendation system capable of realizing item recommendation based on item-based collaborative filtering.

An operation of the recommendation system 20 and a flow of processing of item-based collaborative filtering will next be described with reference to FIG. 5. FIG. 5 is a diagram of assistance in explaining a flow of processing of item-based collaborative filtering.

First, the recommendation system 20 detects a combination of a user and an item to which combination an evaluation value is not given from the evaluation value database 21 by a function of the feature analyzing section 22 (step ST201). Next, the recommendation system 20 detects an item having similar features to those of the item detected in step ST201 by a function of the feature analyzing section 22 (step ST202). Next, the recommendation system 20 refers to an evaluation value given to the item having similar features which item is detected in step ST202 by the user detected in step ST201 by a function of the feature analyzing section 22 (step ST203).

Next, the recommendation system 20 predicts an evaluation value (rating) corresponding to the combination of the user and the item detected in step ST201 on the basis of the evaluation value referred to in step ST203 by a function of the feature analyzing section 22 (step ST204). A result of the prediction in step ST204 is notified from the feature analyzing section 22 to the recommending section 23. Next, when the evaluation value predicted in step ST204 is high, the recommendation system 20 recommends the item detected in step ST201 to the user detected in step ST201 by a function of the recommending section 23 (step ST205). Of course, when the evaluation value is low, the recommendation system 20 does not recommend the item.

As described above, in item-based collaborative filtering, a rating is predicted for a user who has not given a rating for a certain item using an evaluation value given to an item having similar features to those of the certain item. Then, when the rating is high, the item is recommended.

(Problems of Item-Based Collaborative Filtering)

As is inferred from the method of rating prediction in item-based collaborative filtering described thus far, item-based collaborative filtering provides high accuracy when there are a large number of users and a large number of items, and the evaluation value database 21 stores many logs of evaluation values. However, when there are a small number of items, an item having similar features is not detected well, and thus the accuracy of rating prediction becomes low. In addition, an item having similar features to those of an item having many unevaluated features cannot be detected well, and thus the accuracy of rating prediction becomes low. That is, item-based collaborative filtering has a problem of difficulty in recommending an appropriate item suiting the preferences of a user unless under conditions of a large number of users, a large number of items, and many logs of evaluation values.

[1-3: User-Based Content-Based Filtering]

User-based content-based filtering will next be described. User-based content-based filtering is a method using features of a group of items purchased by a certain user to determine an item to be recommended to the user.

(1-3-1: Configuration of Recommendation System 30)

A functional configuration of a recommendation system 30 capable of realizing user-based content-based filtering will first be described with reference to FIG. 7. FIG. 7 is a diagram of assistance in explaining a functional configuration of the recommendation system 30 capable of realizing user-based content-based filtering.

As shown in FIG. 7, the recommendation system 30 is composed mainly of a feature quantity database 31, a feature analyzing section 32, and a recommending section 33.

(Feature Quantity Database 31)

As shown in FIG. 9, the feature quantity database 31 stores scores given to combinations of users and features. The features include for example a "liking for classical music," a "liking for rock music," a "liking for pop music," a "liking for cheerful tunes," a "liking for gloomy tunes," a "liking for female vocals," and a "liking for male vocals." The features can also include a wide variety of other features such for example as a "liking for flower photographs," a "liking for landscape photographs," a "liking for animal photographs," a "liking for horror movies," and a "liking for period dramas." Scores indicating degrees of matching with respective features are obtained by analyzing items purchased by respective users and items used frequently by respective users, for example.

In the example of FIG. 9, scores corresponding to combinations of a user having a user ID=0001 and features having feature IDs=0001 and 0003 are 3 (highest degree of matching). Similarly, a score corresponding to a combination of the user having the user ID=0001 and a feature having a feature ID=0002 is 0 (lowest degree of matching). In addition, a score corresponding to a combination of the user having the user ID=0001 and a feature having a feature ID=0004 is 2 (relatively high degree of matching). The feature quantity database 31 thus stores scores given to respective combinations of users and features. Each user is characterized by a combinations of scores corresponding to a predetermined feature group. Incidentally, the configuration of the database illustrated in FIG. 9 is an example, and the configuration of the feature quantity database 31 is not limited to this example.

(Feature Analyzing Section 32)

Reference will be made to FIG. 7 again. The feature analyzing section 32 is a section configured to analyze the features of each user using the scores stored in the feature quantity database 31. Consideration will be given to for example a process of analyzing the scores stored in the feature quantity database 31 and extracting a user having a liking for an item A to determine the user to whom to recommend the item A. First, the feature analyzing section 32 analyzes the features of users who purchased the item A in the past. In the example of FIG. 9, a high score is given to combinations of users who purchased the item A in the past (user IDs=0001 and 0002) and the features having the feature IDs=0001 and 0003.

Accordingly, the feature analyzing section 32 detects that the high score is given to the features having the feature IDs=0001 and 0003 as features of the users who purchased the item A in the past. Next, the feature analyzing section 32 extracts a user having a high score corresponding to the features having the feature IDs=0001 and 0003 from users who have not purchased the item A in the past. In the example of FIG. 9, the user having a high score corresponding to the features having the feature IDs=0001 and 0003 is a user having a user ID=1001. Accordingly, the feature analyzing section 32 extracts the user having the user ID=1001 as a user to whom to recommend the item A. Information (for example the user ID) on the thus extracted user is notified to the recommending section 33.

(Recommending Section 33)

Reference will be made to FIG. 7 again. As described above, the information on the user extracted by the feature analyzing section 32 is notified to the recommending section 33. Suppose for example that the user ID=1001 is notified from the feature analyzing section 32 to the recommending section 33. In this case, the recommending section 33 recommends the item A to the user having the user ID=1001.

As described above, the recommendation system 30 realizing the processing of user-based content-based filtering characterizes users by combinations of scores indicating degrees of matching of the respective users with a predetermined feature group, and determines an object of recommendation of an item using the combinations of the scores. That is, the recommendation system 30 characterizes users who purchased a certain item in the past by combinations of scores as described above, and recommends the item in question to a user corresponding to a combination of scores which combination is similar to the combinations of the scores.

(1-3-2: Operation of Recommendation System 30)

An operation of the recommendation system 30 and a flow of processing of user-based content-based filtering will next be described with reference to FIG. 8. FIG. 8 is a diagram of assistance in explaining a flow of processing of user-based content-based filtering.

First, the recommendation system 30 analyzes the features of users referring to the scores stored in the feature quantity database 31, and detects the features of users having a liking for the item A, by a function of the feature analyzing section 32 (step ST301). Next, the recommendation system 30 detects a user having similar features to the features of the users having a liking for the item A, the features of the users having a liking for the item A being detected in step ST301, from among users who have not purchased the item A by a function of the feature analyzing section 32 (step ST302). Information on the user detected in step ST302 is notified from the feature analyzing section 32 to the recommending section 33. Next, the recommendation system 30 recommends the item A to the user detected in step ST302 by a function of the recommending section 33 (step ST303).

As described above, in user-based content-based filtering, when an object of recommendation of a certain item is determined from among users who have not purchased the certain item, a process of detecting a user having similar features to those of users who purchased the item in the past is performed. Then, the item is recommended to the user detected by the process.

(Problems of User-Based Content-Based Filtering)

Unlike collaborative filtering described earlier, user-based content-based filtering can determine an object of recommendation of an item when the features of users who purchased the item to be recommended in the past are known. Thus, even under conditions of a small number of users and a small number of items, a user as an object of recommendation of the item can be determined with a certain degree of accuracy. However, in the case of user-based content-based filtering, information on other items is not used to determine the object of recommendation, and therefore the accuracy is not improved even when the number of items is increased. Thus, user-based content-based filtering has a problem of lower accuracy than collaborative filtering under conditions of a large number of items and a large number of users.

User-based content-based filtering represents the features of users by feature quantities prepared in advance. Thus, user-based content-based filtering has another problem in that the performance of user-based content-based filtering is limited by the feature quantities being used. For example, when the feature quantities are too rough, the features of users who have a liking for a certain item are equal to the features of users who do not have a liking for the item, so that the performance is degraded. When the feature quantities are too detailed, users who have a liking for a same item have features different from each other, so that, again, the performance is degraded.

[1-4: Item-Based Content-Based Filtering]

Description will next be made of item-based content-based filtering. Item-based content-based filtering is a method using the features of a user group who purchased a certain item to determine a user as an object of recommendation of the certain item.

(1-4-1: Configuration of Recommendation System 40)

Figure 10:
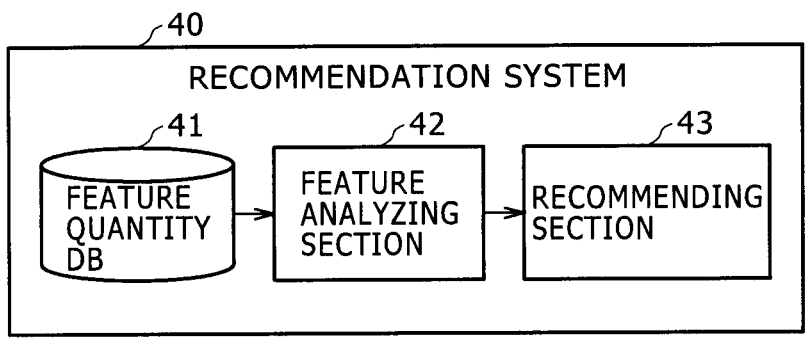
FIG. 10 is a diagram of assistance in explaining a system configuration of a recommendation system capable of realizing item recommendation based on item-based content-based filtering.

A functional configuration of a recommendation system 40 capable of realizing item-based content-based filtering will first be described with reference to FIG. 10. FIG. 10 is a diagram of assistance in explaining a functional configuration of the recommendation system 40 capable of realizing item-based content-based filtering.

As shown in FIG. 10, the recommendation system 40 is composed mainly of a feature quantity database 41, a feature analyzing section 42, and a recommending section 43.

(Feature Quantity Database 41)

Figures 12, 13:
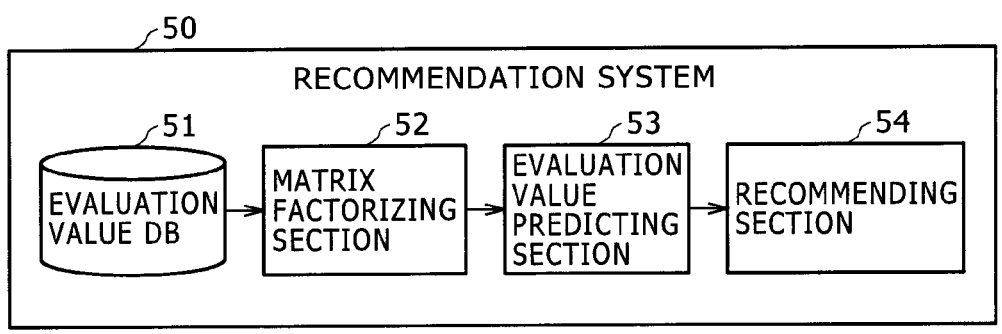
FIG. 12 is a diagram of assistance in explaining the operation of the recommendation system capable of realizing item recommendation based on item-based content-based filtering.
FIG. 13 is a diagram of assistance in explaining a system configuration of a recommendation system capable of realizing item recommendation based on matrix factorization-based collaborative filtering.

As shown in FIG. 12, the feature quantity database 41 stores scores given to combinations of items and features. The features include for example a genre, a performer, a producer, a providing medium, a series, a tune, and an atmosphere. Scores indicating degrees of matching with respective features are given to the respective items in advance by producers or the like, or obtained by machine learning using a large number of items for learning (see Japanese Patent Laid-Open No. 2008-123011 and the like).

In the example of FIG. 12, scores corresponding to combinations of an item having an item ID=0001 and features having feature IDs=0001 and 0003 are 3 (highest degree of matching). Similarly, a score corresponding to a combination of the item having the item ID=0001 and a feature having a feature ID=0002 is 0 (lowest degree of matching). In addition, a score corresponding to a combination of the item having the item ID=0001 and a feature having a feature ID=0004 is 2 (relatively high degree of matching). The feature quantity database 41 thus stores scores given to respective combinations of items and features. Each item is characterized by a combination of scores corresponding to a predetermined feature group. Incidentally, the configuration of the database illustrated in FIG. 12 is an example, and the configuration of the feature quantity database 41 is not limited to this example.

(Feature Analyzing Section 42)

Reference will be made to FIG. 10 again. The feature analyzing section 42 is a section configured to analyze the features of each item using the scores stored in the feature quantity database 41. Consideration will be given to for example a process of analyzing the scores stored in the feature quantity database 41 and extracting an item liked by a user A to determine the item to be recommended to the user A. First, the feature analyzing section 42 analyzes the features of items purchased by the user A in the past. In the example of FIG. 12, a high score is given to combinations of items purchased by the user A in the past (item IDs=0001 and 0002) and the features having the feature IDs=0001 and 0003.

Accordingly, the feature analyzing section 42 detects that the high score is given to the features having the feature IDs=0001 and 0003 as features of the items purchased by the user A in the past. Next, the feature analyzing section 42 extracts an item having high scores corresponding to the features having the feature IDs=0001 and 0003 from items not yet purchased by the user A in the past. In the example of FIG. 12, the item having high scores corresponding to the features having the feature IDs=0001 and 0003 is an item having an item ID=1001. Accordingly, the feature analyzing section 42 extracts the item having the item ID=1001 as an item to be recommended to the user A. Information (for example the item ID) on the thus extracted item is notified to the recommending section 43.

(Recommending Section 43)

Reference will be made to FIG. 10 again. As described above, the information on the item extracted by the feature analyzing section 42 is notified to the recommending section 43. Suppose for example that the item ID=1001 is notified from the feature analyzing section 42 to the recommending section 43. In this case, the recommending section 43 recommends the item having the item ID=1001 to the user A.

As described above, the recommendation system 40 realizing the processing of item-based content-based filtering characterizes items by combinations of scores indicating degrees of matching of the respective items with a predetermined feature group, and determines an item to be recommended to a user using the combinations of the scores. That is, the recommendation system 40 characterizes items purchased by a certain user in the past by combinations of scores as described above, and recommends an item corresponding to a combination of scores which combination is similar to the combinations of the scores to the user in question.

(1-4-2: Operation of Recommendation System 40)

Figure 11:
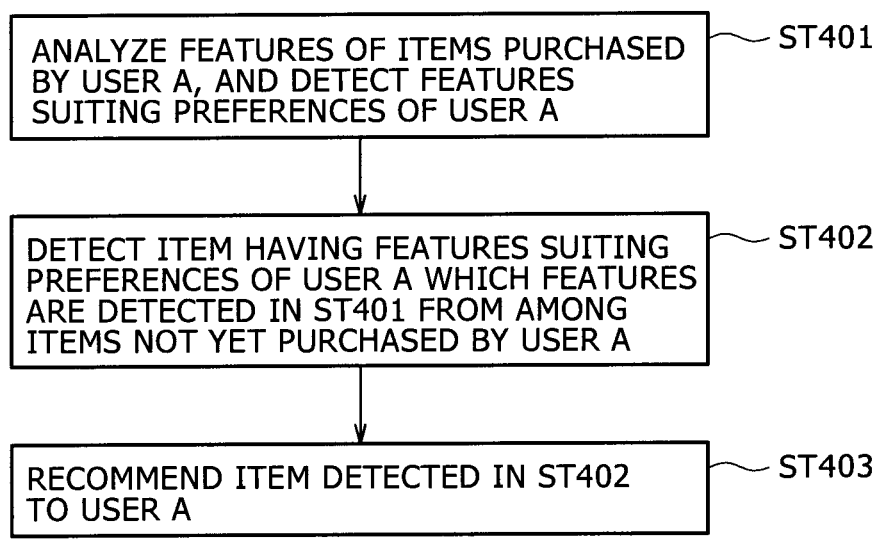
FIG. 11 is a diagram of assistance in explaining operation of the recommendation system capable of realizing item recommendation based on item-based content-based filtering.

An operation of the recommendation system 40 and a flow of processing of item-based content-based filtering will next be described with reference to FIG. 11. FIG. 11 is a diagram of assistance in explaining a flow of processing of item-based content-based filtering.

First, the recommendation system 40 analyzes the features of items referring to the scores stored in the feature quantity database 41, and detects the features of items liked by the user A, by a function of the feature analyzing section 42 (step ST401). Next, the recommendation system 40 detects an item having similar features to the features of the items liked by the user A, the features of the items liked by the user A being detected in step ST401, from among items not yet purchased by the user A by a function of the feature analyzing section 42 (step ST402). Information on the item detected in step ST402 is notified from the feature analyzing section 42 to the recommending section 43. Next, the recommendation system 40 recommends the item detected in step ST402 to the user A by a function of the recommending section 43 (step ST403).

As described above, in item-based content-based filtering, when an item to be recommended to a certain user is determined from among items not yet purchased by the user, a process of detecting an item having similar features to those of items purchased by the user in the past is performed. Then, the item detected by the process is recommended to the user.

(Problems of Item-Based Content-Based Filtering)

Unlike collaborative filtering described earlier, item-based content-based filtering can determine an item to be recommended to a user when the features of items purchased by the user as an object of recommendation in the past are known. Thus, even under conditions of a small number of users and a small number of items, an item to be recommended can be determined with a certain degree of accuracy. However, in the case of item-based content-based filtering, information on other users is not used to determine the item to be recommended, and therefore the accuracy is not improved even when the number of users is increased. Thus, item-based content-based filtering has a problem of lower accuracy than collaborative filtering under conditions of a large number of items and a large number of users.

Item-based content-based filtering represents the features of items by feature quantities prepared in advance. Thus, item-based content-based filtering has another problem in that the performance of item-based content-based filtering is limited by the feature quantities being used. For example, when the feature quantities are too rough, the features of items liked by a certain user are equal to the features of items not liked by the certain user, so that the performance is degraded. When the feature quantities are too detailed, items liked by a same user have features different from each other, so that, again, the performance is degraded.

[1-5: Matrix Factorization-Based Collaborative Filtering]

Description will next be made of matrix factorization-based collaborative filtering. Matrix factorization-based collaborative filtering is a method of estimating vectors corresponding to the preferences of users and vectors corresponding to the features of items so that known evaluation values corresponding to combinations of users and items are explained well, and predicting an unknown evaluation value on the basis of a result of the estimation. Incidentally, matrix factorization-based collaborative filtering is known to achieve higher accuracy than user-based collaborative filtering and item-based collaborative filtering described earlier.

(1-5-1: Configuration of Recommendation System 50)

A functional configuration of a recommendation system 50 capable of realizing matrix factorization-based collaborative filtering will first be described with reference to FIG. 13. FIG. 13 is a diagram of assistance in explaining a functional configuration of the recommendation system 50 capable of realizing matrix factorization-based collaborative filtering.

As shown in FIG. 13, the recommendation system 50 is composed mainly of an evaluation value database 51, a matrix factorizing section 52, an evaluation value predicting section 53, and a recommending section 54.

(Evaluation Value Database 51)

As shown in FIG. 15, the evaluation value database 51 stores an evaluation value corresponding to a combination of a user i and an item j. Incidentally, in the following, for the convenience of description, an ID for identifying each user will be written as i=1, . . . , M, and an ID for identifying each item will be written as j=1, . . . , N. As in the evaluation value database 11 and the like described earlier, there are combinations of users and items to which no evaluation value is given. Matrix factorization-based collaborative filtering is a method of predicting an evaluation value corresponding to a combination of a user and an item to which combination such an evaluation value is not given, in consideration of the latent features of the user and the latent features of the item.

(Matrix Factorizing Section 52)

When an evaluation value corresponding to a user i and an item j is written as $y_{ij}$, a set of evaluation values stored in the evaluation value database 51 can be regarded as an evaluation value matrix $\{y_{ij}\}$ (i=1, . . . , M, j=1, . . . , N) having $y_{ij}$ as an element. The matrix factorizing section 52 introduces a latent feature vector $u_i$ indicating the latent features of the user i (see FIG. 17) and a latent feature vector $v_j$ indicating the latent features of the item j (j=1, . . . , N) (see FIG. 16), and factorizes the evaluation value matrix $\{y_{ij}\}$ and expresses the evaluation value matrix $\{y_{ij}\}$ by the latent feature vectors $u_i$ and $v_j$ so that the whole of the known evaluation values $y_{ij}$ is explained well. The known evaluation values $y_{ij}$ refer to the evaluation values $y_{ij}$ stored in the evaluation value database 51.

Incidentally, each element of the latent feature vector $u_i$ indicates a latent feature of the user. Similarly, each element of the latent feature vector $v_j$ indicates a latent feature of the item. However, as is understood from the use of the expression of "latent" in this case, the elements of the latent feature vectors $u_i$ and $v_j$ do not indicate concrete features of the user and the item, but are mere parameters obtained in model calculation to be described later. However, a group of parameters constituting the latent feature vector $u_i$ reflects the preferences of the user. In addition, a group of parameters constituting the latent feature vector v reflects the features of the item.

Concrete processing by the matrix factorizing section 52 will now be described. First, the matrix factorizing section 52 expresses an evaluation value $y_{ij}$ by an inner product of the latent feature vectors $u_i$ and $v_j$, as shown in Equation (1) below, where a superscript T represents transposition. In addition, suppose that the number of dimensions of the latent feature vectors $u_i$ and $v_j$ is H. In order to obtain the latent feature vectors $u_i$ and $v_j$ such that the whole of the known evaluation values $y_{ij}$ is explained well, it may suffice to calculate the latent feature vectors $u_i$ and $v_j$ that minimize a square error J defined in Equation (2) below, for example. It is known, however, that sufficient prediction accuracy cannot be obtained even when an unknown evaluation value $y_{ij}$ is predicted using the latent feature vectors $u_i$ and $v_j$ that minimize the square error J.

[Equation 1]

$$y_{ij} = u_i^T v_j \quad (1)$$

$$J(\{u_i\}, \{v_j\}; \{y_{ij}\}) = \sum_{i,j} (y_{ij} - u_i^T v_j)^2 \quad (2)$$

(where a sum with respect to i and j on the right side is obtained for a set of known evaluation values)

Accordingly, the matrix factorizing section 52 calculates the latent feature vectors $u_i$ and $v_j$ using a normalization term R defined in Equation (3) below. Specifically, the matrix factorizing section 52 calculates the latent feature vectors $u_i$ and $v_j$ that minimize an objective function Q (see Equation (4) below) expressed by a linear combination of the square error J and the normalization term R. Incidentally, β is a parameter for expressing the weight of the normalization term R. As is clear from Equation (3) below, the normalization term R functions so as to bring the latent feature vectors $u_i$ and $v_j$ close to zero when the latent feature vectors $u_i$ and $v_j$ that minimize the objective function Q are calculated. Incidentally, in order to make the normalization term R function so as to bring the latent feature vectors $u_i$ and $v_j$ close to vectors $\mu_u$ and $\mu_v$ when the latent feature vectors $u_i$ and $v_j$ that minimize the objective function Q are calculated, it suffices to modify the normalization term R as in Equation (5) below.

[Equation 2]

$$R(\{u_i\}, \{v_j\}) = \sum_{i=1}^{M} \|u_i\|^2 + \sum_{j=1}^{N} \|v_j\|^2 \quad (3)$$

-continued $$Q(\{u_i\}, \{v_j\}; \{y_{ij}\}) = J(\{u_i\}, \{v_j\}; \{y_{ij}\}) + \beta \times R(\{u_i\}, \{v_j\}) \quad (4)$$

$$R(\{u_i\}, \{v_j\}) = \sum_{i=1}^{M} \|u_i - \mu_u\|^2 + \sum_{j=1}^{N} \|v_j - \mu_v\|^2 \quad (5)$$

Incidentally, in ordinary matrix factorization-based collaborative filtering described in "Ruslan Salakhutdinov and Andriy Mnih. Probabilistic matrix factorization. In Advances in Neural Information Processing Systems, volume 20, 2008.," the above vector $\mu_u$ is an average of the latent feature vector $u_i$, and the above vector $\mu_v$ is an average of the latent feature vector $v_j$.

Thus, the matrix factorizing section 52 calculates the latent feature vectors $u_i$ and $v_j$ that minimize the objective function Q shown in the above Equation (4). Then, the latent feature vectors $u_i$ and $v_j$ calculated by the matrix factorizing section 52 are input to the evaluation value predicting section 53.
(Evaluation Value Predicting Section 53)

When the latent feature vectors $u_i$ and $v_j$ (i=1, ..., M, j=1, ..., N) are input from the matrix factorizing section 52, the evaluation value predicting section 53 calculates an unknown evaluation value using the input latent feature vectors $u_i$ and $v_j$ on the basis of the above Equation (1). For example, when an evaluation value $y_{mn}$ is unknown, the evaluation value predicting section 53 calculates the evaluation value $y_{mn} = u_m^T v_n$ using latent feature vectors $u_m$ and $v_n$. The unknown evaluation value thus calculated by the evaluation value predicting section 53 is input to the recommending section 54.
(Recommending Section 54)

When the unknown evaluation value $y_{mn}$ is input from the evaluation value predicting section 53, the recommending section 54 determines whether to recommend an item n to a user m on the basis of the input unknown evaluation value $y_{mn}$. When the unknown evaluation value $y_{mn}$ exceeds a predetermined threshold value, for example, the recommending section 54 recommends the item n to the user m. On the other hand, when the unknown evaluation value $y_{mn}$ is less than the predetermined threshold value, the recommending section 54 does not recommend the item n to the user m. Incidentally, the recommending section 54 may be configured to recommend a certain number of items having high rankings, for example, rather than determining an item to be recommended with the threshold value as a reference.

Description has been made above of the functional configuration of the recommendation system 50 capable of realizing matrix factorization-based collaborative filtering. As has been described thus far, only known evaluation values are used in the above matrix factorization-based collaborative filtering. Thus, prediction accuracy is lowered under conditions of a small number of users and a small number of items or a small number of logs of evaluation values.
(1-5-2: Operation of Recommendation System 50)

Figure 14:
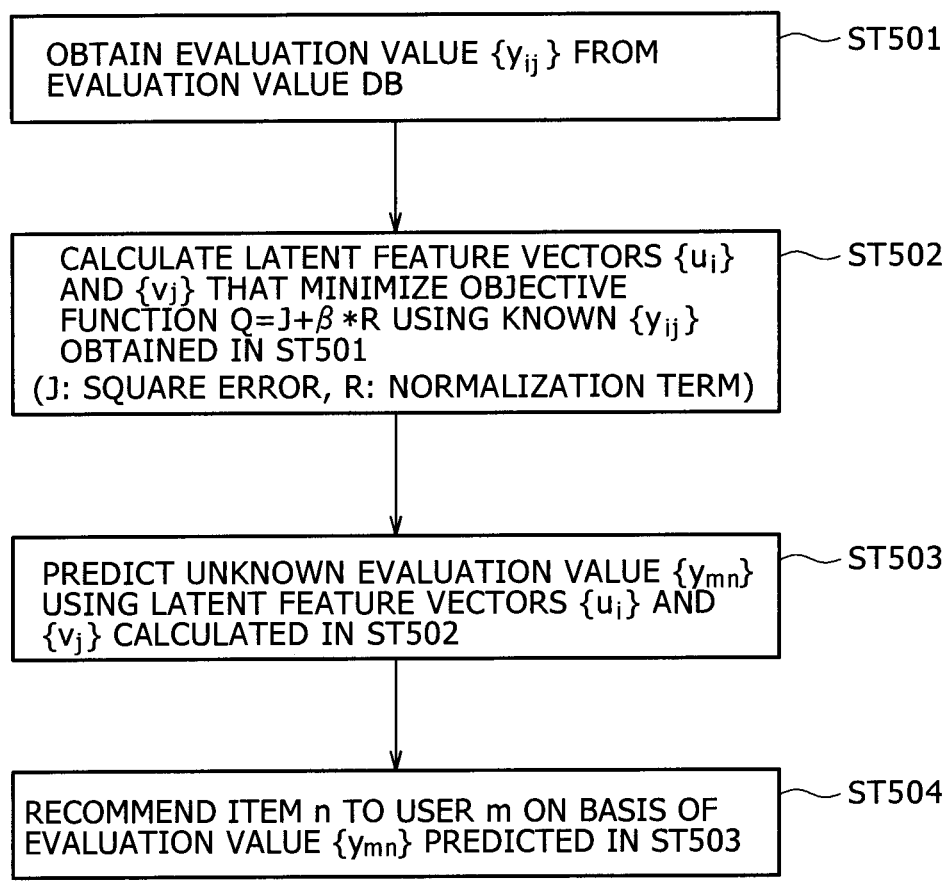
FIG. 14 is a diagram of assistance in explaining operation of the recommendation system capable of realizing item recommendation based on matrix factorization-based collaborative filtering.

An operation of the recommendation system 50 and a flow of processing of matrix factorization-based collaborative filtering will next be described with reference to FIG. 14. FIG. 14 is a diagram of assistance in explaining a flow of processing of matrix factorization-based collaborative filtering.

First, the recommendation system 50 obtains a set $\{y_{ij}\}$ of evaluation values $y_{ij}$ from the evaluation value database 51 by a function of the matrix factorizing section 52 (step ST501). Next, the recommendation system 50 calculates latent feature vectors $\{u_i\}$ and $\{v_j\}$ that minimize the objective function Q defined by the above Equation (3) using the known evaluation value set $\{y_{ij}\}$ obtained in step ST501 by a function of the matrix factorizing section 52 (step ST502). The latent feature vectors {u$_i$} and {v$_j$} calculated by the matrix factorizing section 52 are input to the evaluation value predicting section 53.

Next, the recommendation system 50 calculates (predicts) an unknown evaluation value {y$_{mn}$} using the latent feature vectors {u$_i$} and {v$_j$} calculated in step ST502 by a function of the evaluation value predicting section 53 (step ST503). The unknown evaluation value {y$_{mn}$} calculated by the evaluation value predicting section 53 is input to the recommending section 54. Next, the recommendation system 50 recommends an item n to a user m by a function of the recommending section 54 when the evaluation value {y$_{mn}$} calculated in step ST503 exceeds a predetermined threshold value (step ST504). Of course, the item n is not recommended to the user m when the evaluation value {y$_{mn}$} calculated in step ST503 is less than the predetermined threshold value.

As described above, in matrix factorization-based collaborative filtering, latent feature vectors {u$_i$} and {v$_j$} are calculated using known evaluation values {y$_{ij}$}, and an unknown evaluation value {y$_{mn}$} is predicted on the basis of a result of the calculation. Then, an item n is recommended to a user m on the basis of a result of the prediction.

(Problems of Matrix Factorization-Based Collaborative Filtering)

Matrix factorization-based collaborative filtering achieves high accuracy of evaluation value prediction as compared with user-based collaborative filtering and item-based collaborative filtering described earlier. However, because only known evaluation values are used also in matrix factorization-based collaborative filtering, matrix factorization-based collaborative filtering has a problem of low prediction accuracy under conditions of a small number of users and a small number of items or a small number of logs of evaluation values. A filtering method according to a present embodiment to be described later has been devised to solve such a problem.

<2: First Embodiment>

A first embodiment of the present disclosure will be described in the following. The present embodiment relates to matrix factorization-based collaborative filtering. However, the present embodiment relates to a novel filtering method in which not only known evaluation values but also known features of users and items are taken into account, unlike the matrix factorization-based collaborative filtering described earlier. Thus, when the filtering method according to the present embodiment is applied, evaluation values can be predicted with a sufficiently high accuracy even under conditions of a small number of users and a small number of items or a small number of logs of evaluation values. In addition, because the filtering method according to the present embodiment is based on collaborative filtering, the filtering method according to the present embodiment has another advantage in that the accuracy of prediction of evaluation values is improved as the number of users and the number of items are increased. Detailed description will be made in the following.

[2-1: Viewpoint]

As described above, only known evaluation values are taken into account in the matrix factorization-based collaborative filtering described earlier. Accordingly, the filtering method according to the present embodiment (hereinafter the present method) takes not only known evaluation values but also known features of users and items into account, and reflects these known features in latent feature vectors {u$_i$} and {v$_j$}. For example, in the present method, the normalization term R expressed by the above Equation (5) in the above matrix factorization-based collaborative filtering is changed to a normalization term R shown in the following Equation (6). D$_u$ and D$_v$ included in the following Equation (6) are regression matrices for projecting feature vectors x$_{ui}$ and x$_{vj}$ into the spaces of latent feature vectors u$_i$ and v$_j$, respectively.

[Equation 3]

$$R(\{u_i\}, \{v_j\}) = \sum_{i=1}^{M} \|u_i - D_u x_{ui}\|^2 + \sum_{j=1}^{N} \|v_j - D_v x_{vj}\|^2 \quad (6)$$

In the case where the normalization term R is changed as in the above Equation (6), when latent feature vectors {u$_i$} and {v$_j$} are calculated so as to minimize the objective function Q expressed by the above Equation (4), the latent feature vector u$_i$ is limited in such a manner as to approach D$_u$x$_{ui}$, and the latent feature vector v is limited in such a manner as to approach D$_v$x$_{vj}$. Thus, the latent feature vectors u$_i$ of users having similar known features approach each other. Similarly, the latent feature vectors v$_j$ of items having similar known features approach each other. Thus, even for a user or an item with a small number of evaluation values, a latent feature vector similar to that of another user or another item can be obtained on the basis of known features. As a result, an evaluation value can be predicted with high accuracy even for a user or an item under conditions of a small number of known evaluation values. In the following, description will be made of a concrete calculating method and a configuration of an evaluation value predicting device 100 capable of realizing the calculating method.

[2-2: Functional Configuration of Evaluation Value Predicting Device 100]

Figure 18:
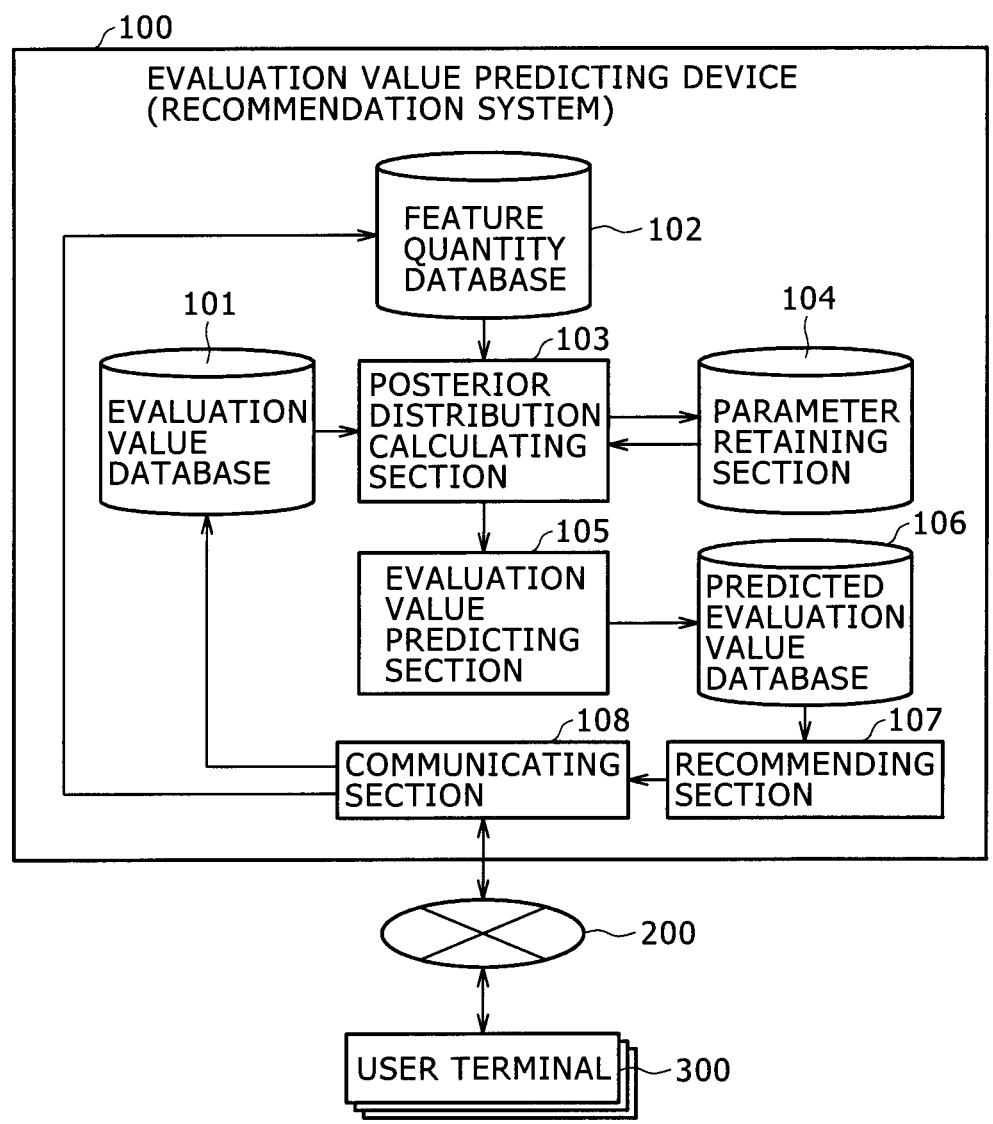
FIG. 18 is a diagram of assistance in explaining a function configuration of an evaluation value predicting device according to a first embodiment of the present disclosure.

A functional configuration of an evaluation value predicting device 100 capable of realizing the filtering method according to the present embodiment will be described with reference to FIG. 18. FIG. 18 is a diagram of assistance in explaining a functional configuration of the evaluation value predicting device 100 according to the present embodiment. Incidentally, while the configuration of the evaluation value predicting device 100 illustrated in FIG. 18 includes a constituent element for recommending an item to a user, only a part for predicting an unknown evaluation value may be extracted to form the evaluation value predicting device 100. In the following, the evaluation value predicting device 100 will be described as an example of a recommendation system to facilitate comparison with the recommendation system 50 and the like described earlier.

As shown in FIG. 18, the evaluation value predicting device 100 includes an evaluation value database 101, a feature quantity database 102, a posterior distribution calculating section 103, and a parameter retaining section 104. The evaluation value predicting device 100 further includes an evaluation value predicting section 105, a predicted evaluation value database 106, a recommending section 107, and a communicating section 108. In addition, the evaluation value predicting device 100 is for example connected to a user terminal 300 via a network 200.

(Evaluation Value Database 101)

As shown in FIG. 15, the evaluation value database 101 stores an evaluation value given to a combination of a user i and an item j. Incidentally, as in the matrix factorization-based collaborative filtering described earlier, for the convenience of description, an ID for identifying each user will be written as i=1, ..., M, and an ID for identifying each item will be written as j=1, ..., N. In addition, each evaluation value will be written as y$_{ij}$, and a set of the evaluation values will be written as {y$_{ij}$}. Incidentally, the present method is similar to the above matrix factorization-based collaborative filtering also in that an unknown evaluation value not stored in the evaluation value database 101 is predicted.
(Feature Quantity Database 102)

As shown in FIG. 20 and FIG. 21, the feature quantity database 102 stores each element of a feature vector $\{x_{ui}\}$ indicating known features of a user and each element of a feature vector $\{x_{vj}\}$ indicating known features of an item. Known features of a user include for example an age, a gender, a birthplace, and an occupation. Known features of an item include for example a genre, an author, a performer, a director, a year of publication, and a tune.
(Posterior Distribution Calculating Section 103 and Parameter Retaining Section 104)

In the present method, as shown in the above Equation (6), the regression matrices $D_u$ and $D_v$ are added as parameters. Thus, in order to minimize an effect of an increase in the number of parameters on the accuracy of estimation, an estimating method such as Bayesian estimation or the like will be used in the present embodiment. Bayesian estimation is a method of estimating an unknown parameter under conditions where learning data is given, using a stochastic model. In the case of the present embodiment, a known evaluation value set $\{y_{ij}\}$ and feature vectors $\{x_{ui}\}$ and $\{x_{vj}\}$ are given as learning data. There are an unknown evaluation value set $\{y_{mn}\}$, regression matrices $D_u$ and $D_v$, and other parameters included in the stochastic model as unknown parameters. Description will first be made of the stochastic model used in the present method.

The stochastic model used in the present method is expressed by the following Equations (7) to (9). In the following equations, $N(\mu, \Sigma)$ represents a normal distribution with an average $\mu$ and a covariance matrix $\Sigma$. In addition, $diag(\ldots)$ represents a diagonal matrix having ... as diagonal elements. Incidentally, $\lambda$, $\beta_u$, and $\beta_v$ are parameters introduced in the stochastic model. $\lambda$ is a scalar quantity, $\beta_u = (\beta_{u1}, \ldots, \beta_{uH})$, and $\beta_v = (\beta_{v1}, \ldots, \beta_{vH})$. The stochastic model expressed by the following Equations (7) to (9) is equivalent to an operation of calculating latent feature vectors $\{u_i\}$ and $\{v_j\}$ so as to minimize the objective function Q using the normalization term R expressed by the above Equation (6). However, a change is made to a more flexible model in that the scalar quantity parameter $\beta$ appearing in the above Equation (4) is changed to the vector quantities $\beta_u$ and $\beta_v$.

[Equation 4]

$$y_{ij} \sim N(u_i^T v_j, \lambda^{-1}) \quad (7)$$

$$u_i \sim N(D_u x_{ui}, diag(\beta_u)^{-1}) \quad (8)$$

$$v_j \sim N(D_v x_{vj}, diag(\beta_v)^{-1}) \quad (9)$$

The posterior distribution calculating section 103 is a section configured to perform Bayesian estimation on the basis of the above-described stochastic model, and calculate the posterior distribution of the latent feature vectors $\{u_1\}$ and $\{v_j\}$, the regression matrices $D_u$ and $D_v$, and the parameters $\lambda$, $\beta_u$, and $\beta_v$ included in the stochastic model. Incidentally, in the following description, the latent feature vectors $\{u_1\}$ and $\{v_j\}$, the regression matrices $D_u$ and $D_v$, and the parameters $\lambda$, $\beta_u$, and $\beta_v$ included in the stochastic model may be referred to collectively as a parameter. In addition, the parameter set or calculated by the posterior distribution calculating section 103 is stored in the parameter retaining section 104. Further, suppose that variational Bayesian estimation as an approximate method of Bayesian estimation is used in this case.

Bayesian estimation includes an estimating step of obtaining the posterior distribution of each parameter under conditions where learning data is given on the basis of the stochastic model and a predicting step of marginalizing the obtained posterior distribution and obtaining the distribution of the parameter and an expected value thereof. When a complex stochastic model is used, the posterior distribution also becomes very complex, and it is difficult to obtain the distribution and the expected value of the parameter desired to be obtained in the predicting step. In the case of variational Bayesian estimation, on the other hand, the complication of the posterior distribution is avoided by approximating the posterior distribution by a distribution easy to calculate, so that the distribution and the expected value of the parameter are obtained easily.

When the learning data is expressed as a vector quantity X, and a set of parameters is expressed as $\Theta = \{\theta_1, \ldots, \theta_K\}$, in the case of variational Bayesian estimation, the posterior distribution $p(\Theta|X)$ is approximated as in the following Equation (10). In addition, it is known that when such an approximation is made, the variational posterior distribution $q(\theta_k)$ of a parameter $\theta_k$ (k=1, ..., K) is expressed by the following Equation (11) and Equation (12). $E_{p(x)}[f(x)]$ denotes the expected value of $f(x)$ under a distribution $p(x)$. In addition, const. denotes a constant. Incidentally, each variational posterior distribution $q(\theta_k)$ (k=1, ..., K) is dependent on another distribution. Thus, in order to calculate an optimum variational posterior distribution, it is necessary to repeatedly perform a process of updating the parameter of each variational posterior distribution under another variational posterior distribution, under an appropriate initializing process. A concrete algorithm relating to this process will be described later.

[Equation 5]

$$p(\Theta \mid X) \approx \prod_{k=1}^{K} q(\theta_k) \quad (10)$$

$$\ln q(\theta_k) = E_{q(\Theta_{(k)})}[\ln p(X, \Theta)] + const. \quad (11)$$

$$q(\Theta_{(k)}) = \prod_{l \neq k} q(\theta_l) \quad (12)$$

Here, the algorithm relating to the above-described variational Bayesian estimation is applied to the stochastic model expressed by the above Equations (7) to (9). First, the posterior distribution $p(\Theta|X)$ is expressed as in the following Equation (13). In the following equation, the regression matrices $D_u$ and $D_v$ are expressed as $D_u = (d_{u1}, \ldots, d_{uH})^T$ and $D_v = (d_{v1}, \ldots, d_{vH})^T$. Incidentally, $d_{uh}$ and $d_{vh}$ (h=1, ..., H) is a vector quantity.

[Equation 6]

$$p(\{u_i\}_{i=1}^{m}, \{v_j\}_{j=1}^{N}, D_u, D_v, \beta_u, \beta_v, \lambda \mid \{y_{ij}\}, \{x_{ui}\}_{i=1}^{M}, \{x_{vj}\}_{j=1}^{N}) \approx \quad (13)$$

$$\prod_{i=1}^{M} q(u_i) \prod_{j=1}^{N} q(v_j) \prod_{h=1}^{H} (q(d_{uh})q(d_{vh})q(\beta_{uh})q(\beta_{vh}))q(\lambda)$$

There is symmetry between the latent feature vectors $u_i$ and $v_j$. Accordingly, in the following, consideration will be given to only the distribution of $u_i$. In addition, in order to simplify notation, $\beta_u$ will be written simply as $\beta = (\beta_1, \ldots, \beta_H)$, $D_u$ will be written simply as D, $d_{uh}$ will be written as $d_h$, and $x_{ui}$ will be written as $x_i$. Suppose that a feature quantity $x_i$, a regression vector $d_h$, and the parameter $\gamma_h$ of prior distribution thereof have K dimensions. In this case, the prior distributions of the parameters $d_h$ and $\beta$ are defined as in the following Equations (14) and (15). In addition, the distribution of the parameter $\gamma=(\gamma_1, \ldots, \gamma_K)$ appearing in the following Equation (14) is defined as in the following Equation (16). These distributions are conjugate prior distributions with which posterior distributions are also identical. Incidentally, when there is no prior knowledge, it suffices to set the parameter of the prior distribution to a uniform distribution. In addition, when prior knowledge is to be reflected, it suffices to adjust the parameter of the prior distribution.

[Equation 7]

$$p(d_h)=N(d_h;0,diag(\gamma)^{-1}) \quad (14)$$

$$p(\beta_h)=Gam(\beta_h;a_{\beta h},b_{\beta h}) \quad (15)$$

$$p(\gamma_h)=Gam(\gamma_h;a_{\gamma h},b_{\gamma h}) \quad (16)$$

Incidentally, Gam( . . . ) denotes a gamma distribution. The posterior distribution calculating section 103 calculates the variational posterior distribution of the above Equation (11) under conditions shown in the above Equations (13) to (16). First, the variational posterior distribution $q(u_i)$ of the latent feature vector $u_i$ is the following Equation (17). Parameters $\mu'_{ui}$ and $\Sigma'_{ui}$ appearing in the following Equation (17) are expressed by the following Equations (18) and (19). In addition, the variational posterior distribution $q(d_h)$ of an element $d_h$ of the regression matrix D is the following Equation (20). Parameters $\mu'_{dh}$ and $\Sigma'_{dh}$ appearing in the following Equation (20) are expressed by the following Equations (21) and (22).

[Equation 8]

$$q(u_i)=N(u_i;\mu'_{ui},\Sigma'_{ui}) \quad (17)$$

$$\mu'_{ui}=E[\Sigma'_{ui}\{\lambda V^T diag(\pi_i)y_i+diag(\beta)Dx_i\}] \quad (18)$$

$$\Sigma'^{-1}_{ui}=E[\lambda V^T diag(\pi_i)V+diag(\beta)] \quad (19)$$

$$q(d_h)=N(d_h;\mu'_{dh},\Sigma'_{dh}) \quad (20)$$

$$\mu'_{dh}=E[\beta_h\Sigma'_{dh}X^T u_h] \quad (21)$$

$$\Sigma'^{-1}_{dh}=E[\beta_h X^T X+diag(\gamma)] \quad (22)$$

Incidentally, a vector $\pi_i=(\pi_{i1}, \ldots, \pi_{iN})^T$ appearing in the above Equations (18) and (19) assumes $\pi_{ij}=1$ when an evaluation value $y_{ij}$ is known, and assumes $\pi_{ij}=0$ when the evaluation value $y_{ij}$ is unknown. In addition, a vector $y_i$ appearing in the above Equation (18) is a vector $y_i=(y_{i1}, \ldots, y_{iN})^T$ having the evaluation value $y_{ij}$ as an element. V appearing in the above Equations (18) and (19) is a matrix $V=(v_1, \ldots, v_N)^T$ having the latent feature vector $v_j$ as an element. Further, X appearing in the above Equations (21) and (22) is a matrix $X=(x_1, \ldots, x_N)^T$ having the feature vector $x_i$ as an element.

In addition, variational posterior distributions $q(\beta)$ and $q(\gamma)$ of the parameters $\beta$ and $\gamma$ of the stochastic model are expressed by the following Equations (23) and (26), respectively. Parameters $a'_{\beta h}$ and $b'_{\beta h}$ appearing in the following Equation (23) are expressed by the following Equations (24) and (25). Parameters $a'_{\gamma k}$ and $b'_{\gamma k}$ appearing in the following Equation (26) are expressed by the following Equations (27) and (28).

[Equation 9]

$$q(\beta) = \prod_{h=1}^{H} Gam(\beta_h; a'_{\beta h}, b'_{\beta h}) \quad (23)$$

-continued $$a'_{\beta h} = \alpha_\beta + \frac{M}{2} \quad (24)$$

$$b'_{\beta h} = E\left[b_\beta + \frac{1}{2}\sum_{i=1}^{M}(u_{ih} - x_i^T d_h)^2\right] \quad (25)$$

$$q(\gamma) = \prod_{k=1}^{K} Gam(\gamma_k; a'_{\gamma k}, b'_{\gamma k}) \quad (26)$$

$$a'_{\gamma k} = a_{\gamma k} + \frac{H}{2} \quad (27)$$

$$b'_{\gamma k} = E\left[b_\gamma + \frac{1}{2}\sum_{h=1}^{H} d_{hk}^2\right] \quad (28)$$

Because the variational posterior distribution of each parameter is expressed by using the above Equations (17) to (28), an optimum variational posterior distribution of each parameter is obtained by updating the parameter of each variational posterior distribution under another variational posterior distribution on the basis of the following algorithm. An algorithm for updating the latent feature vector $u_i$ (i=1, . . . , M) is shown in the following.

[Equation 10]
(Algorithm for updating the latent feature vector $u_i$ (i = 1, . . . , M))
<<Initialization>> (A1)

$E[V] \leftarrow (\mu'_{v1}, \ldots, \mu'_{vN})^T$
$E[D] \leftarrow (\mu'_{d1}, \ldots, \mu'_{dH})^T$
$E[\beta] \leftarrow (a_{\beta 1}/b_{\beta 1}, \ldots, a_{\beta H}/b_{\beta H})^T$
$E[\gamma] \leftarrow (a_{\gamma 1}/b_{\gamma 1}, \ldots, a_{\gamma K}/b_{\gamma K})^T$
<<Calculation of $q(u_i)$>> (A2)

for i = 1 to M do $$E[V^T diag(\pi_i)V] \leftarrow \sum_{j=1}^{N} \pi_{ij}(\Sigma'_{vj} + \mu'_{vj}\mu'^T_{vj})$$

$\Sigma'_{ui} \leftarrow \{\lambda E[V^T diag(\pi_i)V] + diag(E[\beta])\}^{-1}$
$\mu'_{ui} \leftarrow \Sigma'_{ui}\{E[\lambda]E[V]^T diag(\pi_i)y_i + diag(E[\beta])[D]x_i\}$
end for
<<Calculation of $q(d_h)$>> (A3)

for h = 1 to H do
  $E[\mu_h] \leftarrow (\{\mu'_{ui}\}_h, \ldots, \{\mu'_{uM}\}_h)$
  $\Sigma'_{dh} \leftarrow \{E[\beta_h]X^T X + diag(E[\gamma])\}^{-1}$
  $\mu'_{dh} \leftarrow E[\beta_h]\Sigma'_{dh}X^T E[u_h]$
end for
<<Calculation of $q((\beta))$>> (A4)

for h = 1 to H do
  $E[u_{ih}^2] \leftarrow \{E'_{ui}\}_{hh} + \{\mu'_{ui}\}_h^2$
  $E[u_{ih}] \leftarrow \{\mu'_{ui}\}_h$
  $E[d_h] \leftarrow \mu_{dh}$ $$a'_{\beta h} \leftarrow a_\beta + \frac{M}{2}$$

$$b'_{\beta h} \leftarrow b_{\beta h} + \frac{1}{2}\sum_{i=1}^{M}\left\{E[u_{ih}^2] - 2E[u_{ih}]x_i^T E[d_h] + \sum_{k=1}^{K}x_{ik}^2 E[d_{hk}^2]\right\}$$

end for
<<Calculation of $q(\gamma)$>> (A5)

for k = 1 to K do
  $E[d_{hk}^2] \leftarrow \{\Sigma'_{dh}\}_{kk} + \{\mu'_{dh}\}_k^2$ $$a'_{\gamma h} \leftarrow a_\gamma + \frac{H}{2}$$

$$b'_{\gamma k} \leftarrow b_\gamma + \frac{1}{2}\sum_{h=1}^{H} E[d_{hk}^2]$$

end for

An algorithm for updating the latent feature vector $v_j$ ($j=1,\ldots,N$) is similarly shown in the following. However, in the algorithm for updating the latent feature vector $v_j$, $\beta=(\beta_1,\ldots,\beta_H)$ represents $\beta_v$, D represents $D_v$, $d_h$ represents $d_{vh}$, and $x_j$ represents $x_{vj}$. In addition, suppose that a feature quantity xj, a regression vector $d_h$, and the parameter $\gamma_h$ of prior distribution thereof have K dimensions. Further, $\pi_j=(\pi_{i,j},\ldots,\pi_{Mj})^T$ assumes $\pi_{ij}=1$ when an evaluation value $y_{ij}$ is known, and assumes $\pi_{ij}=0$ when the evaluation value $y_{ij}$ is unknown. In addition, $y_j$ is a vector $y_j=(y_{2j},\ldots,y_{Mj})^T$ having the evaluation value $y_{ij}$ as an element. U is a matrix $U=(u_1,\ldots,u_M)^T$ having the latent feature vector $u_i$ as an element. Further, X is a matrix $X=(x_1,\ldots,x_M)^T$ having the feature vector $x_j$ as an element.

[Equation 11]
(Algorithm for updating the latent feature vector $v_j$ ($j = 1,\ldots,N$))
<<Initialization>>

(B1)
$E[U] \leftarrow (\mu'_{u1},\ldots,\mu'_{uM})^T$
$E[D] \leftarrow (\mu'_{d1},\ldots,\mu'_{dH})^T$
$E[\beta] \leftarrow (a'_{\beta 1}/b'_{\beta 1},\ldots,a'_{\beta H}/b'_{\beta H})^T$
$E[\gamma] \leftarrow (a'_{\gamma 1}/b'_{\gamma 1},\ldots,a'_{\gamma K}/b'_{\gamma K})^T$
<<Calculation of $q(v_j)$>>

(B2)
for j = 1 to N do $$E[U^T \text{diag}(\pi_j)U] \leftarrow \sum_{i=1}^{M} \pi_{ij}(\Sigma'_{ui} + \mu'_{ui}\mu'^T_{ui})$$

$\Sigma'_{vj} \leftarrow \{\lambda E[U^T\text{diag}(\pi_j)U] + \text{diag}(E[\beta])\}^{-1}$
$\mu'_{vj} \leftarrow \Sigma'_{vj}\{E[\lambda]E[U]^T\text{diag}(\pi_j)y_j + \text{diag}(E[\beta])E[D]x_j\}$
end for
<<Calculation of $q(d_h)$>>

(B3)
for h = 1 to H do
$E[v_h] \leftarrow (\{\mu'_{v1}\}_h,\ldots,\{\mu'_{vN}\}_h)$
$\Sigma'_{dh} \leftarrow \{E[\beta_h][X^TX + \text{diag}(E[\gamma])]\}^{-1}$
$\mu'_{dh} \leftarrow E[\beta_h]\Sigma'_{dh}X^TE[v_h]$
end for
<<Calculation of $q(\beta)$>>

(B4)
for h = 1 to H do
$E[v_{jh}^2] \leftarrow \{\Sigma'_{vj}\}_{hh} + \{\mu'_{vj}\}_h^2$
$E[v_{jh}] \leftarrow \{\mu'_{vj}\}_h$
$E[d_h] \leftarrow \mu'_{dh}$ $$a'_{\beta h} \leftarrow a_\beta + \frac{N}{2}$$

$$b'_{\beta h} \leftarrow b_{\beta h} + \frac{1}{2}\sum_{j=1}^{N}\left\{E[v_{jh}^2] - 2E[v_{jh}]x_j^TE[d_h] + \sum_{k=1}^{K}x_{jk}^2 E[d_{hk}^2]\right\}$$

end for
<<Calculation of $q(\gamma)$>>

(B5)
for k = 1 to K do
$E[d_{hk}^2] \leftarrow (\{\Sigma'_{dh}\}_{kk} + \{\mu'_{dh}\}_k^2$ $$a'_{\gamma k} \leftarrow a_\gamma + \frac{H}{2}$$

$$b'_{\gamma k} \leftarrow b_\gamma + \frac{1}{2}\sum_{h=1}^{H}E[d_{hk}^2]$$

end for

The posterior distribution calculating section 103 iteratively performs the above updating algorithms for U and V alternately until the parameters converge. The variational posterior distribution of each parameter is obtained by this process. The variational posterior distribution obtained in the posterior distribution calculating section 103 is input from the posterior distribution calculating section 103 to the evaluation value predicting section 105. A process up to this point is an estimating step. After completing the estimating step, the evaluation value predicting device 100 advances the process to a predicting step.

(Variational Posterior Distribution of Parameter $\lambda$)

The variational posterior distribution of the parameter $\lambda$ will be supplemented in the following. The variational posterior distribution $q(\lambda)$ of the parameter $\lambda$ is as shown in the following Equation (30) when the prior distribution $p(\lambda)$ of $\lambda$ is expressed by the following Equation (29). $a'_\lambda$ and $b'_\lambda$ appearing in the following Equation (30) are expressed as in the following Equations (31) and (32), respectively. Thus, while the parameter $\lambda$ can be estimated using the variational posterior distribution $q(\lambda)$, the parameter $\lambda$ and an expected value $E[\lambda]$ thereof can also be set through a preliminary experiment or the like.

[Equation 12]

$$p(\lambda) = Gam(\lambda; a_\lambda, b_\lambda) \qquad (29)$$

$$q(\lambda) = Gam(\lambda; a'_\lambda, b'_\lambda) \qquad (30)$$

$$a'_\lambda = a_\lambda + \frac{1}{2}\sum_{i=1}^{M}\sum_{j=1}^{N}\pi_{ij} \qquad (31)$$

$$b'_\lambda = E\left[b_\lambda + \frac{1}{2}\sum_{i=1}^{M}\sum_{j=1}^{N}\pi_{ij}(y_{ij} - u_i^T v_j)^2\right] \qquad (32)$$

(Evaluation Value Predicting Section 105)

The evaluation value predicting section 105 calculates the expected value of an evaluation value $y_{ij}$ on the basis of the variational posterior distribution of each parameter input from the posterior distribution calculating section 103 as a process of the predicting step. As described above, the variational posterior distributions $q(u_i)$ and $q(v_j)$ of latent feature vectors have been obtained by the posterior distribution calculating section 103. Accordingly, the evaluation value predicting section 105 calculates an expected value for an inner product of the latent feature vectors $u_i$ and $v_j$ (evaluation value $y_{ij}$), as shown in the following Equation (33). The expected value of the evaluation value which expected value is thus calculated by the evaluation value predicting section 105 is stored in the predicted evaluation value database 106.

[Equation 13]

$$E[y_{ij}] = E[u_i^T v_j] \quad (33)$$
$$= E[u_i^T]E[v_j]$$
$$= \mu'^T_{ui} \mu'_{vj}$$

(Recommending Section 107 and Communicating Section 108)

The recommending section 107 refers to an expected value (hereinafter predicted evaluation value) for an unknown evaluation value, which expected value is stored in the predicted evaluation value database 106, and recommends an item to a user when the predicted evaluation value is high. For example, the recommending section 107 recommends an item n to a user m when a predicted evaluation value $y_{mn}$ exceeds a predetermined threshold value. In addition, the recommending section 107 may refer to the predicted evaluation value database 106, generate a list by sorting items not evaluated by a certain user in decreasing order of the predicted evaluation value, and present the list to the user in question. For example, the recommending section 107 transmits the generated list to the user terminal 300 via the communicating section 108. Then, the transmitted list is transferred to the user terminal 300 via the network 200, and displayed on a display section (not shown) of the user terminal 300.

The functional configuration of the evaluation value predicting device 100 has been described above.

(Memory Savings)

A sufficient memory capacity is necessary to realize the filtering method according to the present embodiment using the latent feature vectors $u_i$ and $v_j$ of a large number of dimensions. For example, to retain $\Sigma'_{ui}$ (i=1, ..., M) and $\Sigma'_{vj}$ (j=1, ..., N) appearing in the above-described updating algorithms in a memory needs memory areas of $O(MH^2)$ [bits] and $O(NH^2)$ [bits], respectively. Thus, when the number M of users, the number N of items, and the number H of dimensions of the latent feature vectors are large, an enormous memory capacity is necessary only to retain these pieces of information.

Similarly, a memory area of $O(HK^2)$ [bits] is necessary to retain $\Sigma'_{dh}$ (h=1, ..., H). Thus, when the number H of dimensions of the latent vectors and the number K of feature quantities are large, an enormous memory capacity is necessary only to retain this information. Accordingly, in order to reduce the necessary memory capacity, average vectors $\mu'_{ui}$, $\mu'_{vj}$, and $\mu'_{dh}$ are updated by a conjugate gradient method or the like, and only diagonal elements of $\Sigma'_{ui}$, $\Sigma'_{vj}$, and $\Sigma'_{dh}$ are retained. This method can greatly reduce the memory capacity necessary to realize the above-described updating algorithms.

[2-3: Operation of Evaluation Value Predicting Device 100]

Figure 19:
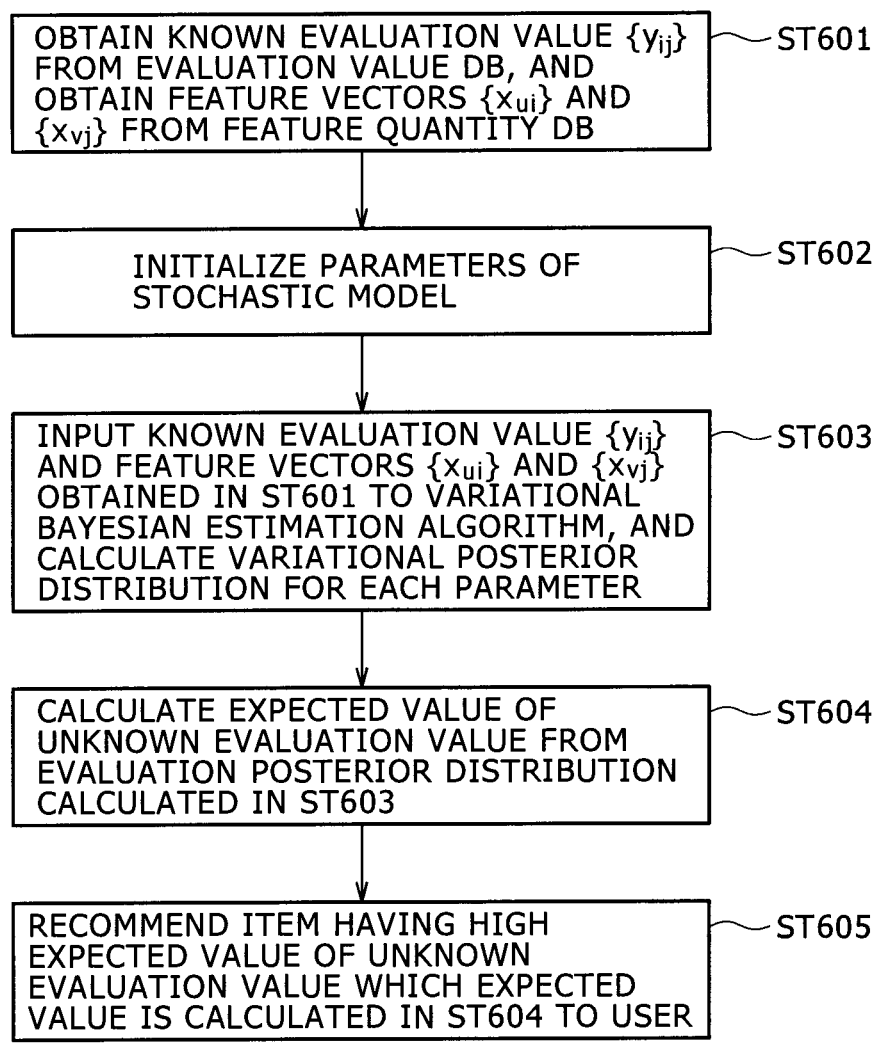
FIG. 19 is a diagram of assistance in explaining operation of the evaluation value predicting device according to the first embodiment of the present disclosure.

An operation of the evaluation value predicting device 100 and a flow of processing of the filtering method according to the present embodiment will next be described with reference to FIG. 19. FIG. 19 is a diagram of assistance in explaining a flow of processing of the filtering method according to the present embodiment.

First, the evaluation value predicting device 100 obtains a known evaluation value $\{y_{ij}\}$ from the evaluation value database 101, and obtains feature vectors $\{x_{ui}\}$ and $\{x_{vj}\}$ from the feature quantity database 102, by a function of the posterior distribution calculating section 103 (step ST601). Next, the evaluation value predicting device 100 initializes the parameters included in the stochastic model by a function of the posterior distribution calculating section 103 (step ST602). Next, the evaluation value predicting device 100 inputs the known evaluation value $\{y_{ij}\}$ and the feature vectors $\{x_{ui}\}$ and $\{x_{vj}\}$ obtained in step ST601 to a variational Bayesian estimation algorithm, and calculates the variational posterior distribution of each parameter, by a function of the posterior distribution calculating section 103 (step ST603).

The variational posterior distribution calculated in step ST603 is input from the posterior distribution calculating section 103 to the evaluation value predicting section 105. Next, the evaluation value predicting device 100 calculates the expected value (predicted evaluation value) of an unknown evaluation value from the variational posterior distribution calculated in step ST603 by a function of the evaluation value predicting section 105 (step ST604). The predicted evaluation value calculated in this step is stored in the predicted evaluation value database 106. Next, the evaluation value predicting device 100 recommends an item having a high predicted evaluation value calculated in step ST604 to a user by a function of the recommending section 107 (step ST605).

As described above, the filtering method according to the present embodiment is a novel filtering method that takes known feature vectors into account while including elements of matrix factorization-based collaborative filtering. Thus, a high estimation accuracy can be achieved even under conditions of a small number of users and a small number of items or a small number of known evaluation values.

Examples of Application

Description has thus far been made of a method of predicting an unknown evaluation value, which method is designed for evaluation values corresponding to combinations of users and items. However, the present method is applicable to an arbitrary method of predicting an unknown label, which method is designed for arbitrary labels given to combinations of items of a certain item group A and items of a certain item group B.

First Example

The present method is applicable to a system that predicts an evaluation value or a purchase probability of a user for an item and which recommends the item to the user as a system applied to combinations of users and items. In this case, an age, a gender, an occupation, and a birthplace, for example, are used as feature quantities of a user. A genre, an author, a performer, and a date, for example, are used as features of an item.

Second Example

In addition, the present method is applicable to a system that predicts the probability of a user suffering from a disease as a system applied to combinations of users and diseases. In this case, an age, a gender, living habits, and a feature quantity based on a gene, for example, are used as feature quantities of a user. Incidentally, when only feature quantities based on genes are used, the present method is applicable to a system associating genes with diseases.

Third Example

In addition, the present method is applicable to a system that predicts the prices of stocks as a system applied to combinations of stocks and a market. In this case, a feature quantity based on financial statements of a company and time-dependent feature quantities such as a market average and the prices of other companies in the same industry, for example, are used as feature quantities of a stock.

Fourth Example

In addition, the present method is applicable to a system that predicts an evaluation word of a user for a content and which presents contents matching the word as a system applied to combinations of users and contents. In this case, an image feature quantity and a feature quantity obtained by twelve-tone analysis, for example, are used as feature quantities of a content.

Fifth Example

In addition, the present method is applicable to an SNS (social networking service) assistance system that predicts the ease of connection between users as a system applied to combinations of users and users. In this case, an age, a gender, a diary, and the feature quantities of friends, for example, are used as feature quantities of a user.

Sixth Example

In addition, the present method is applicable to a system that predicts whether an object indicated by a word is present in an image as a system applied to combinations of images and words.

Thus, the present method is applicable to systems that predict labels given to combinations of various item groups A and B.

The first embodiment of the present disclosure has been described above.

<3: Second Embodiment>

A second embodiment of the present disclosure will next be described. The present embodiment relates to a time series analyzing method in which the foregoing first embodiment is applied to the prediction of time-series data.

A Kalman filter, for example, is known as a time series analyzing method. The Kalman filter is a method used to estimate a temporally changing quantity using an observed value having an error. On the other hand, in the present embodiment, when a set of evaluation values corresponding to combinations of users and items changes temporally, a system that predicts a set of evaluation values expected to be observed in the future from the evaluation values of the set is realized, for example.

Incidentally, it is difficult to achieve the above-described system taken up in the present embodiment even when the Kalman filter is expanded to two dimensions. For example, when an unevaluated element is included in a set of evaluation values at a certain time point, an evaluation value in the future which evaluation value corresponds to the element cannot be predicted by the Kalman filter. Accordingly, the present embodiment proposes a method of predicting, from an evaluation value set at a certain time point, an evaluation value set at a next time point, and predicting, from a known evaluation value set at the next time point, an unknown evaluation value at the same time point (which method will hereinafter be referred to as a present method).

[3-1: Functional Configuration of Evaluation Value Predicting Device 130]

Figure 22:
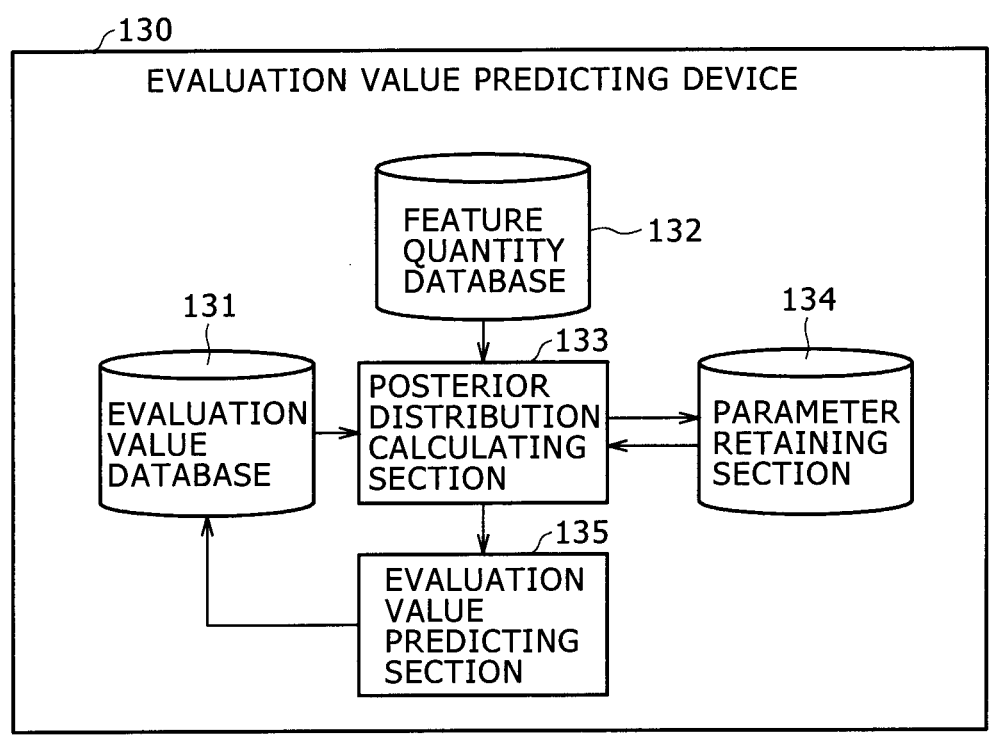
FIG. 22 is a diagram of assistance in explaining operation of an evaluation value predicting device according to a second embodiment of the present disclosure.

A functional configuration of an evaluation value predicting device 130 according to the present embodiment capable of realizing the present method will first be described with reference to FIG. 22. FIG. 22 is a diagram of assistance in explaining a functional configuration of the evaluation value predicting device 130 according to the present embodiment.

As shown in FIG. 22, the evaluation value predicting device 130 is composed mainly of an evaluation value database 131, a feature quantity database 132, a posterior distribution calculating section 133, a parameter retaining section 134, and an evaluation value predicting section 135.

The configuration of the evaluation value database 131 is essentially the same as the evaluation value database 101 of the evaluation value predicting device 100 according to the foregoing first embodiment. However, the evaluation value database 131 stores evaluation values corresponding to combinations of users and items at each time point. In addition, the evaluation value database 131 stores an evaluation value predicted by the evaluation value predicting section 135 to be described later. On the other hand, the configuration of the feature quantity database 132 is essentially the same as the feature quantity database 102 of the evaluation value predicting device 100 according to the foregoing first embodiment.

A large difference between the evaluation value predicting device 100 according to the foregoing first embodiment and the evaluation value predicting device 130 according to the present embodiment is the difference of a stochastic model used by the posterior distribution calculating section 133. The posterior distribution calculating section 133 uses the stochastic model expressed by the following Equations (34) to (36). Incidentally, $y_{ij}(t)$ denotes an evaluation value $y_{ij}$ at time t. In addition, $u_i(t)$ and $v_j(t)$ denote latent feature vectors $u_i$ and $v_j$ at time t.

[Equation 14]

$$y_{ij}(t) \sim N(u_i(t)^T v_j(t), \lambda^{-1}) \tag{34}$$

$$u_i(t) \sim N(D_u u_i(t-1), diag(\beta_u)^{-1}) \tag{35}$$

$$v_j(t) \sim N(D_v v_j(t-1), diag(\beta_v)^{-1}) \tag{36}$$

A large difference from the stochastic model according to the foregoing first embodiment (above Equations (7) to (9)) is that the feature vectors $x_{ui}$ and $x_{vj}$ appearing in the above Equations (8) and (9) are replaced with latent feature vectors $u_i(t-1)$ and $v_j(t-1)$ at a previous time (t−1). Incidentally, it suffices to set $u_i(0)=x_{ui}$ and $v_j(0)=x_{vj}$ at an initial (t=0) time point. Thereafter, it suffices to obtain the distributions of latent feature vectors $u_i(t)$ and $v_j(t)$ sequentially using the latent feature vectors $u_i(t-1)$ and $v_j(t-1)$ (t>1) obtained by a variational Bayesian estimation algorithm as in the foregoing first embodiment. When the distributions of the latent feature vectors $u_i(t)$ and $v_j(t)$ are obtained, an expected value of an evaluation value $y_{ij}$ at time t is obtained. That is, an unevaluated element of an evaluation value set is obtained sequentially.

Incidentally, because the variational Bayesian estimation algorithm for calculating the variational posterior distributions of the latent feature vectors $u_i(t)$ and $v_j(t)$ is essentially the same as in the foregoing first embodiment, description of a method for calculating these variational posterior distributions will be omitted. The time-series data of an evaluation value set thus obtained can be used to grasp changes in preferences of a user, for example. In addition, the time-series data of an evaluation value set thus obtained can be applied to the recommendation of an item according to the changes in preferences of the user. Further, the time-series data of an evaluation value set thus obtained may be applied to various fields ((First Example) to (Sixth Example) described above and the like) as in the foregoing first embodiment.

[3-2: Operation of Evaluation Value Predicting Device 130]

Figure 23:
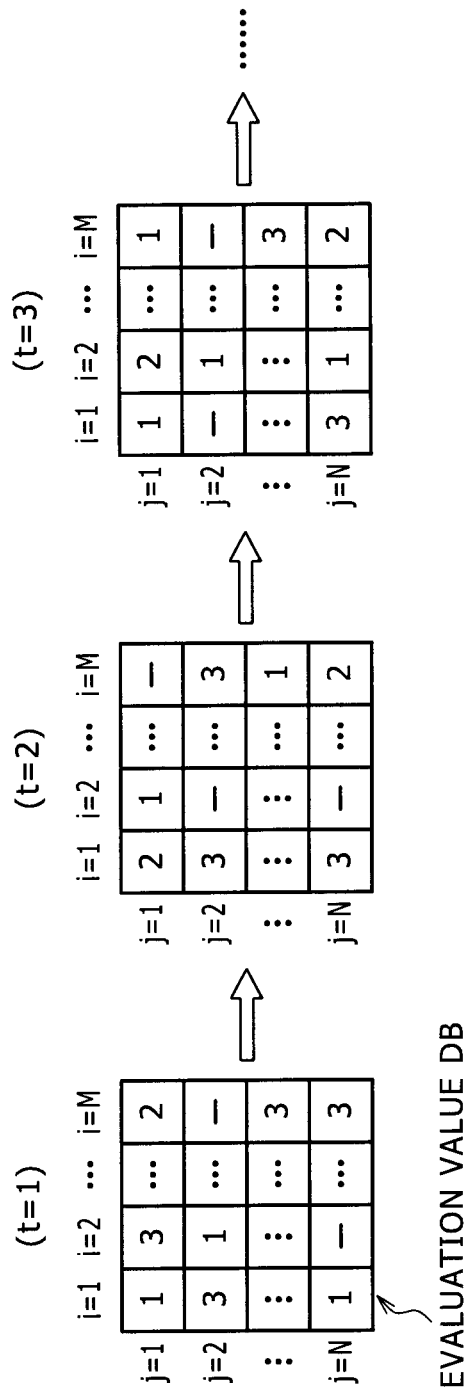
FIG. 23 is a diagram of assistance in explaining the operation of the evaluation value predicting device according to the second embodiment of the present disclosure.

An operation of the evaluation value predicting device 130 will next be described with reference to FIG. 23. FIG. 23 is a diagram of assistance in explaining an operation of the evaluation value predicting device 130.

(Initial Processing Step)

First, the evaluation value predicting device 130 obtains a known evaluation value $\{y_{ij}\}$ at time t=0 (initial time point) from the evaluation value database 131. Next, the evaluation value predicting device 130 obtains feature vectors $\{x_{ui}\}$ and $\{x_{vj}\}$ from the feature quantity database 132 as in the foregoing first embodiment. Then, the evaluation value predicting device 130 predicts an unknown evaluation value on the basis of a stochastic model similar to that of the foregoing first embodiment, and stores the predicted evaluation value in the evaluation value database 131. At this time point, evaluation values $\{y_{ij}\}$ corresponding to all combinations of users and items at time t=0 are stored in the evaluation value database 131. In addition, the variational posterior distributions of latent feature vectors $\{u_i(0)\}$ and $\{v_j(0)\}$ at time t=0 are obtained by the posterior distribution calculating section 133, and stored in the parameter retaining section 134.

(Sequential Processing Step)

Next, the evaluation value predicting device 130 obtains a known evaluation value $\{y_{ij}\}$ at time t=1 from the evaluation value database 131. Next, the evaluation value predicting device 130 calculates the variational posterior distribution of each parameter at time t=1 using a stochastic model at time t=1 which stochastic model is obtained from the variational posterior distributions of the latent feature vectors $\{u_i(0)\}$ and $\{v_j(0)\}$ at time t=0. Then, the evaluation value predicting device 130 predicts an unknown evaluation value at time t=1 using the calculated variational posterior distribution, and stores the predicted evaluation value in the evaluation value database 131. At this time point, evaluation values $\{y_{ij}\}$ corresponding to all combinations of users and items at time t=1 are stored in the evaluation value database 131. In addition, the variational posterior distributions of latent feature vectors $\{u_i(1)\}$ and $\{v_j(1)\}$ at time t=1 are obtained by the posterior distribution calculating section 133, and stored in the parameter retaining section 134.

The time-series prediction of an evaluation value set $\{y_{ij}\}$ is realized by sequentially repeating the process of the above sequential processing step until a predetermined time. As is clear from the above description, in the case of the present method, an unknown evaluation value at a certain time point t is calculated from a known evaluation value at the time point t and a known evaluation value and latent feature vectors at a previous time point (t−1). Thus, unlike the Kalman filter, the time-series prediction of evaluation values is made possible even when there is a part (combination of a user and an item) where an evaluation value is not input at consecutive time points.

The second embodiment of the present disclosure has been described above.

<4: Example of Hardware Configuration>

Figure 24:
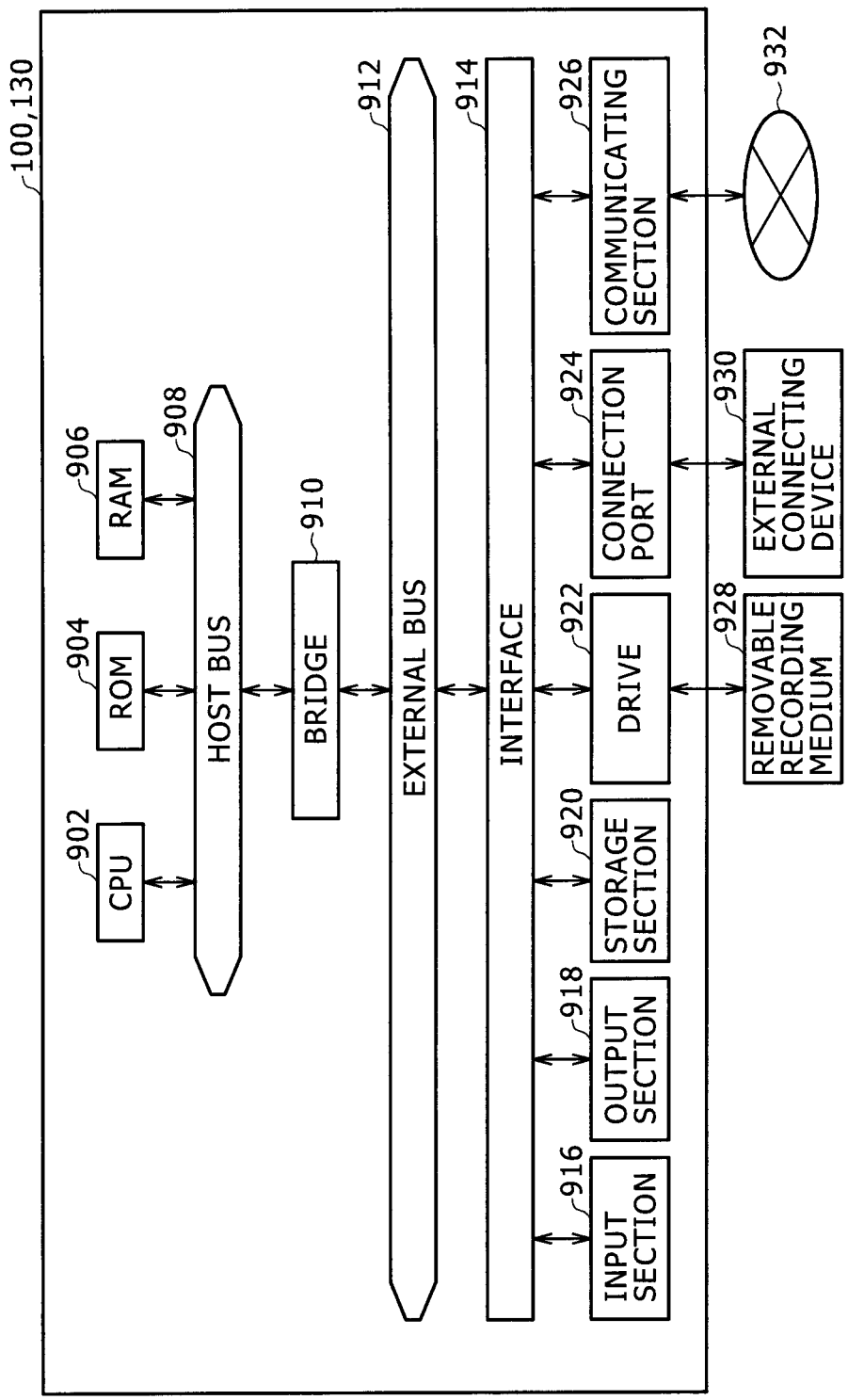
FIG. 24 is a diagram of assistance in explaining an example of hardware configuration of an information processing device capable of realizing the functions of the evaluation value predicting device according to each embodiment of the present disclosure.

The functions of each of constituent elements possessed by the evaluation value predicting devices 100 and 130 described above can be realized by using a hardware configuration of an information processing device shown in FIG. 24, for example. That is, the functions of each of the constituent elements are realized by controlling hardware shown in FIG. 24 using a computer program. Incidentally, the hardware has an arbitrary form. The hardware includes for example personal computers, portable telephones, PHSs, portable information terminals such as PDAs and the like, game machines, or various home information appliances. The above PHS is an abbreviation of Personal Handy-phone System. The above PDA is an abbreviation of Personal Digital Assistant.

As shown in FIG. 24, the hardware mainly includes a CPU 902, a ROM 904, a RAM 906, a host bus 908, and a bridge 910. The hardware further includes an external bus 912, an interface 914, an input section 916, an output section 918, a storage section 920, a drive 922, a connection port 924, and a communicating section 926. The above CPU is an abbreviation of Central Processing Unit. The above ROM is an abbreviation of Read Only Memory. The above RAM is an abbreviation of Random Access Memory.

The CPU 902 for example functions as an arithmetic processing unit or a control device, and controls the whole or a part of operation of each constituent element on the basis of various programs recorded in the ROM 904, the RAM 906, the storage section 920, or a removable recording medium 928. The ROM 904 is a memory configured to store a program to be loaded into the CPU 902, data used for operation, and the like. The RAM 906 for example temporarily or permanently stores a program to be loaded into the CPU 902 and various parameters changing as appropriate when the program is executed.

These constituent elements are for example interconnected via the host bus 908 capable of high-speed data transmission. The host bus 908 is for example connected to the external bus 912 having a relatively low data transmission speed via the bridge 910. In addition, for example a mouse, a keyboard, a touch panel, a button, a switch, a lever and the like are used as the input section 916. Further, a remote control (hereinafter a remote) capable of transmitting a control signal using infrared rays or other radio waves may be used as the input section 916.

The output section 918 is a device capable of notifying information obtained to a user visually or aurally, which device includes a display such as a CRT, an LCD, a PDP, an ELD or the like, an audio output device such as a speaker, a headphone or the like, a printer, a portable telephone, a facsimile machine, or the like. The above CRT is an abbreviation of Cathode Ray Tube. In addition, the above LCD is an abbreviation of Liquid Crystal Display. The above PDP is an abbreviation of Plasma Display Panel. Further, the above ELD is an abbreviation of Electro-Luminescence Display.

The storage section 920 is a device for storing various kinds of data. For example, a magnetic storage device such as a hard disk drive (HDD) or the like, a semiconductor storage device, an optical storage device, a magneto-optical storage device, or the like is used as the storage section 920. The above HDD is an abbreviation of Hard Disk Drive.

The drive 922 is for example a device for reading information recorded on the removable recording medium 928 such as a magnetic disk, an optical disk, a magneto-optical disk, a semiconductor memory or the like, and writing information to the removable recording medium 928. The removable recording medium 928 is for example DVD media, Blu-ray media, HD DVD media, various kinds of semiconductor storage media and the like. Of course, the removable recording medium 928 may be for example an IC card including a noncontact type IC chip, an electronic device, or the like. The above IC is an abbreviation of Integrated Circuit.

The connection port 924 is for example a USB port, an IEEE1394 port, a SCSI, an RS-232C port, or a port for connecting an external connecting device 930 such as an optical audio terminal or the like. The external connecting device 930 is for example a printer, a portable music player, a digital camera, a digital video camera, an IC recorder or the like. The above USB is an abbreviation of Universal Serial Bus. In addition, the above SCSI is an abbreviation of Small Computer System Interface.

The communicating section 926 is a communicating device for connecting to a network 932. The communicating section 926 is for example a communication card for a wired or wireless LAN, Bluetooth (registered trademark), or WUSB, a router for optical communication, a router for ADSL, a modem for various kinds of communication, or the like. In addition, the network 932 connected to the communicating section 926 is formed by a network connected by wire or radio. The network 932 is for example the Internet, a home LAN, infrared communication, visible light communication, broadcasting, satellite communication, or the like. The above LAN is an abbreviation of Local Area Network. In addition, the above WUSB is an abbreviation of Wireless USB. The above ADSL is an abbreviation of Asymmetric Digital Subscriber Line.

While preferred embodiments of the present disclosure have been described above with reference to the accompanying drawings, it is needless to say that the present disclosure is not limited to such examples. It is obvious that various examples of changes or modifications within the scope described in claims will occur to those skilled in the art, and it is naturally understood that these examples fall within the technical scope of the present disclosure.

(Notes)

The above-described user is an example of a first item. The above-described item is an example of a second item. The above-described latent feature vector $u_i$ is an example of a first latent vector. The above-described latent feature vector $v_j$ is an example of a second latent vector. The above-described feature vector $x_{ui}$ is an example of a first feature vector. The above-described feature vector $x_{vj}$ is an example of a second feature vector. The above-described regression matrix $D_u$ is an example of a first projection matrix. The above-described regression matrix $D_v$ is an example of a second projection matrix. The above-described posterior distribution calculating section 103 is an example of an estimating section. The above-described evaluation value predicting section 105 is an example of a predicting section.

The present disclosure contains subject matter related to that disclosed in Japanese Priority Patent Application JP 2010-124165 filed in the Japan Patent Office on May 31, 2010, the entire content of which is hereby incorporated by reference.

What is claimed is:

1. A hardware configuration of an information processing device comprising a microprocessor configured to execute evaluation prediction functions, the microprocessor comprising:

an estimating section configured to define
a plurality of first latent vectors indicating features latently possessed by a plurality of first items, respectively,
a plurality of second latent vectors indicating features latently possessed by a plurality of second items, respectively,
evaluation values corresponding to respective combinations of said first items and said second items and expressed by inner products of said first latent vectors and said second latent vectors,
a plurality of first feature vectors indicating known features possessed by the plurality of said first items,
a plurality of second feature vectors indicating known features possessed by the plurality of said second items,
a first projection matrix for projecting said first feature vectors into a space of said first latent vectors, and
a second projection matrix for projecting said second feature vectors into a space of said second latent vectors,
express said first latent vectors by a normal distribution having projection values of said first feature vectors projected by said first projection matrix as expected values, and express said second latent vectors by a normal distribution having projection values of said second feature vectors projected by said second projection matrix as expected values, and
perform Bayesian estimation with said first feature vectors, said second feature vectors, and a known said evaluation value as learning data, and calculate a posterior distribution of a parameter group including said first latent vectors, said second latent vectors, said first projection matrix, and said second projection matrix; and
a predicting section configured to calculate a distribution of an unknown said evaluation value on a basis of the posterior distribution of said parameter group and calculate an expected value of said unknown evaluation value on the basis of the posterior distribution of said parameter group.

2. The evaluation predicting device according to claim 1, further comprising a recommendation object determining section configured to, when the expected value of said unknown evaluation value calculated by said predicting section is higher than a predetermined value, determine a second item corresponding to said unknown evaluation value as an object of recommendation of a first item corresponding to said unknown evaluation value.

3. The evaluation predicting device according to claim 2, wherein said second item represents a user, and the evaluation predicting device further comprises
a recommending section configured to recommend said first item to the user corresponding to the object of recommendation of said first item when said recommendation object determining section determines the object of recommendation of the first item.

4. A hardware configuration of an information processing device comprising a microprocessor configured to execute evaluation prediction functions, the microprocessor comprising:

an estimating section configured to define
N first latent vectors $u_i(t)$ (i=1, . . . , N) indicating features latently possessed by N first items, respectively, at time t,
M second latent vectors $v_j(t)$ (j=1, . . . , M) indicating features latently possessed by M second items, respectively, at time t,
evaluation values $y_{ij}(t)$ corresponding to respective combinations of said first items and said second items and expressed by inner products of said first latent vectors $u_i(t)$ and said second latent vectors $v_j(t)$ at time t,
a first projection matrix for projecting first latent vectors $u_i(t-1)$ at time (t−1) into a space of said first latent vectors $u_i(t)$ at time t, and
a second projection matrix for projecting second latent vectors $v_j(t-1)$ at time (t−1) into a space of said second latent vectors $v_j(t)$ at time t,
express the first latent vectors $u_i(t)$ at time t by a normal distribution having projection values obtained by projecting the first latent vectors $u_i(t-1)$ at time (t−1) by said first projection matrix as expected values, and express the second latent vectors $v_j(t)$ at time t by a normal distribution having projection values obtained by projecting the second latent vectors $v_j(t-1)$ at time $(t-1)$ by said second projection matrix as expected values, and perform Bayesian estimation with the first latent vectors $u_i(t-1)$, the second latent vectors $v_j(t-1)$, and evaluation values $y_{ij}(t-1)$ at time $(t-1)$ as learning data, and calculate a posterior distribution of a parameter group including the first latent vectors $u_i(t)$, the second latent vectors $v_j(t)$, said first projection matrix, and said second projection matrix at time t; and a predicting section configured to calculate an expected value of an evaluation value $y_{ij}(t)$ at time t on a basis of the posterior distribution of said parameter group at time t.

5. The evaluation predicting device according to claim 4, wherein said predicting section calculates expected values of the first latent vectors $u_i(t)$, expected values of the second latent vectors $v_j(t)$, and the evaluation values $y_{ij}(t)$ at time t on the basis of the posterior distribution of the parameter group at said time t, said estimating section expresses first latent vectors $u_i(t+1)$ at time $(t+1)$ by a normal distribution having projection values obtained by projecting the expected values of the first latent vectors $u_i(t)$ at time t by said first projection matrix as expected values, and expresses second latent vectors $v_j(t+1)$ at time $(t+1)$ by a normal distribution having projection values obtained by projecting the expected values of the second latent vectors $v_j(t)$ at time t by said second projection matrix as expected values, and performs variational Bayesian estimation with the first latent vectors $u_i(t)$, the second latent vectors $v_j(t)$, and the evaluation values $y_{ij}(t)$ at time t as learning data, and calculates a posterior distribution of a parameter group including the first latent vectors $u_i(t+1)$, the second latent vectors $v_j(t+1)$, said first projection matrix, and said second projection matrix at time $(t+1)$, and said predicting section calculates an expected value of an evaluation value $y_{ij}(t+1)$ at time $(t+1)$ on a basis of the posterior distribution of said parameter group at time $(t+1)$.

6. The evaluation predicting device according to claim 5, further comprising a recommendation object determining section configured to, when the expected value of the evaluation value $y_{ij}(t+1)$ calculated by said predicting section is higher than a predetermined value, determine a second item corresponding to said evaluation value $y_{ij(t+}1)$ as an object of recommendation of a first item corresponding to said evaluation value $y_{ij}(t+1)$.

7. The evaluation predicting device according to claim 6, wherein said second item represents a user, and the evaluation predicting device further comprises:

a recommending section configured to recommend said first item to the user corresponding to the object of recommendation of said first item when said recommendation object determining section determines the object of recommendation of the first item.

8. An evaluation predicting method comprising:
defining
a plurality of first latent vectors indicating features latently possessed by a plurality of first items, respectively,
a plurality of second latent vectors indicating features latently possessed by a plurality of second items, respectively, evaluation values corresponding to respective combinations of said first items and said second items and expressed by inner products of said first latent vectors and said second latent vectors,
a plurality of first feature vectors indicating known features possessed by the plurality of said first items,
a plurality of second feature vectors indicating known features possessed by the plurality of said second items,
a first projection matrix for projecting said first feature vectors into a space of said first latent vectors, and
a second projection matrix for projecting said second feature vectors into a space of said second latent vectors,
expressing said first latent vectors by a normal distribution having projection values of said first feature vectors projected by said first projection matrix as expected values, and expressing said second latent vectors by a normal distribution having projection values of said second feature vectors projected by said second projection matrix as expected values, and
performing Bayesian estimation with said first feature vectors, said second feature vectors, and a known said evaluation value as learning data, and calculating a posterior distribution of a parameter group including said first latent vectors, said second latent vectors, said first projection matrix, and said second projection matrix;
calculating a distribution of an unknown said evaluation value on a basis of the posterior distribution of said parameter group; and
calculating an expected value of said unknown evaluation value on the basis of the posterior distribution of said parameter group.

9. An evaluation predicting method comprising:
defining
N first latent vectors $u_i(t)$ (i=1, . . . , N) indicating features latently possessed by N first items, respectively, at time t,
M second latent vectors $v_j(t)$ (j=1, . . . , M) indicating features latently possessed by M second items, respectively, at time t,
evaluation values $y_{ij}(t)$ corresponding to respective combinations of said first items and said second items and expressed by inner products of said first latent vectors $u_i(t)$ and said second latent vectors $v_j(t)$ at time t,
a first projection matrix for projecting first latent vectors $u_i(t-1)$ at time $(t-1)$ into a space of said first latent vectors $u_i(t)$ at time t, and
a second projection matrix for projecting second latent vectors $v_j(t-1)$ at time $(t-1)$ into a space of said second latent vectors $v_j(t)$ at time t,
expressing the first latent vectors $u_i(t)$ at time t by a normal distribution having projection values obtained by projecting the first latent vectors $u_i(t-1)$ at time $(t-1)$ by said first projection matrix as expected values, and expressing the second latent vectors $v_j(t)$ at time t by a normal distribution having projection values obtained by projecting the second latent vectors $v_j(t-1)$ at time $(t-1)$ by said second projection matrix as expected values, and
performing Bayesian estimation with the first latent vectors $u_i(t-1)$, the second latent vectors $v_j(t-1)$, and evaluation values $y_{ij}(t-1)$ at time $(t-1)$ as learning data, and calculating a posterior distribution of a parameter group including the first latent vectors $u_i(t)$, the second latent vectors $v_j(t)$, said first projection matrix, and said second projection matrix at time t; and calculating an expected value of an evaluation value $y_{ij}(t)$ at time t on a basis of the posterior distribution of said parameter group at time t.

10. A non-transitory, computer-readable medium comprising instructions for making a computer realize:

an estimating function of defining a plurality of first latent vectors indicating features latently possessed by a plurality of first items, respectively, a plurality of second latent vectors indicating features latently possessed by a plurality of second items, respectively, evaluation values corresponding to respective combinations of said first items and said second items and expressed by inner products of said first latent vectors and said second latent vectors, a plurality of first feature vectors indicating known features possessed by the plurality of said first items, a plurality of second feature vectors indicating known features possessed by the plurality of said second items, a first projection matrix for projecting said first feature vectors into a space of said first latent vectors, and a second projection matrix for projecting said second feature vectors into a space of said second latent vectors, expressing said first latent vectors by a normal distribution having projection values of said first feature vectors projected by said first projection matrix as expected values, and expressing said second latent vectors by a normal distribution having projection values of said second feature vectors projected by said second projection matrix as expected values, and performing Bayesian estimation with said first feature vectors, said second feature vectors, and a known said evaluation value as learning data, and calculating a posterior distribution of a parameter group including said first latent vectors, said second latent vectors, said first projection matrix, and said second projection matrix; and a predicting function of calculating a distribution of an unknown said evaluation value on a basis of the posterior distribution of said parameter group and calculating an expected value of said unknown evaluation value on the basis of the posterior distribution of said parameter group.

11. A non-transitory, computer-readable medium comprising instructions for making a computer realize:

an estimating function of defining

N first latent vectors $u_i(t)$ (i=1, ..., N) indicating features latently possessed by N first items, respectively, at time t, M second latent vectors $v_j(t)$ (j=1, ..., M) indicating features latently possessed by M second items, respectively, at time t, evaluation values $y_{ij}(t)$ corresponding to respective combinations of said first items and said second items and expressed by inner products of said first latent vectors $u_i(t)$ and said second latent vectors $v_j(t)$ at time t, a first projection matrix for projecting first latent vectors $u_i(t-1)$ at time (t−1) into a space of said first latent vectors $u_i(t)$ at time t, and a second projection matrix for projecting second latent vectors $v_j(t-1)$ at time (t−1) into a space of said second latent vectors $v_j(t)$ at time t, expressing the first latent vectors $u_i(t)$ at time t by a normal distribution having projection values obtained by projecting the first latent vectors $u_i(t-1)$ at time (t−1) by said first projection matrix as expected values, and expressing the second latent vectors $v_j(t)$ at time t by a normal distribution having projection values obtained by projecting the second latent vectors $v_j(t-1)$ at time (t−1) by said second projection matrix as expected values, and performing Bayesian estimation with the first latent vectors $u_i(t-1)$, the second latent vectors $v_j(t-1)$, and evaluation values $y_{ij}(t-1)$ at time (t−1) as learning data, and calculating a posterior distribution of a parameter group including the first latent vectors $u_i(t)$, the second latent vectors $v_j(t)$, said first projection matrix, and said second projection matrix at time t; and a predicting function of calculating an expected value of an evaluation value $y_{ij}(t)$ at time t on a basis of the posterior distribution of said parameter group at time t.

* * * * *